United States Patent [19]
Ashinuma et al.

[11] Patent Number: 5,517,471
[45] Date of Patent: May 14, 1996

[54] METHOD AND APPARATUS FOR VERIFYING RECORDING DATA AND FOR DETERMINING RECORDING ERROR USING A DETECTED LIGHT AMOUNT

[75] Inventors: Takaaki Ashinuma, Yokohama; Takatoshi Suzuki, Tokyo; Masakuni Yamamoto, Yamato, all of Japan

[73] Assignee: Canon Kabushiki Kaisha, Tokyo, Japan

[21] Appl. No.: 998,859

[22] Filed: Dec. 30, 1992

[30] Foreign Application Priority Data

Jan. 6, 1992 [JP] Japan ..................... 4-018142
Jan. 31, 1992 [JP] Japan ..................... 4-016509
Dec. 18, 1992 [JP] Japan ..................... 4-338798

[51] Int. Cl.$^6$ ..................... G11B 11/00; G11B 11/12
[52] U.S. Cl. ..................... 369/13; 369/54; 369/58
[58] Field of Search ..................... 369/13, 59, 48, 369/54, 58, 47, 60, 110, 116, 32; 360/114, 59; 365/122

[56] References Cited

U.S. PATENT DOCUMENTS

| | | | |
|---|---|---|---|
| 4,672,483 | 6/1987 | Kawada | 360/51 |
| 4,879,703 | 11/1989 | Kaku et al. | 369/13 |
| 4,908,811 | 3/1990 | Yokogawa et al. | 369/54 |
| 4,912,694 | 3/1990 | Yamamoto | 369/59 |
| 5,189,650 | 2/1993 | Watanabe et al. | 369/13 |

FOREIGN PATENT DOCUMENTS

| | | |
|---|---|---|
| 0087174 | 8/1983 | European Pat. Off. . |
| 0420211 | 4/1991 | European Pat. Off. . |
| 58-17546 | 2/1983 | Japan . |
| 62-54857 | 3/1987 | Japan . |
| 3-73448 | 3/1991 | Japan . |

OTHER PUBLICATIONS

Patent Abstracts of Japan, Kokai No. 60–121533, vol. 9, No. 276, Jun. 1985.
Patent Abstracts of Japan, Kokai No. 3–214448, vol. 15, No. 495, Sep. 1991.
Patent Abstracts of Japan, Kokai No. 1–082348, vol. 13, No. 314, Mar. 1989.
Patent Abstracts of Japan, Kokai No. 3–044848, vol. 15, No. 192, Feb. 1991.
Patent Abstracts of Japan, Kokai No. 3–73448, vol. 15, No. 237, Mar. 1991.

*Primary Examiner*—Ali Neyzari
*Attorney, Agent, or Firm*—Fitzpatrick, Cella, Harper & Scinto

[57] ABSTRACT

A light beam is applied to an information recording medium to record information. A light amount of the light beam reflected by the recording medium is detected simultaneously with the recording of information. A defect of the recording medium is detected by comparing the detected light amount with a reference value. When a degree of the detected defect exceeds a predetermined level, the information is rerecorded on another portion of the recording medium.

16 Claims, 28 Drawing Sheets

LIGHT SPOT

MODULATED MAGNETIC FIELD

LIGHT INTENSITY

DOMAIN

LIGHT SPOT

BIAS MAGNETIC FIELD

LIGHT INTENSITY

DOMAIN

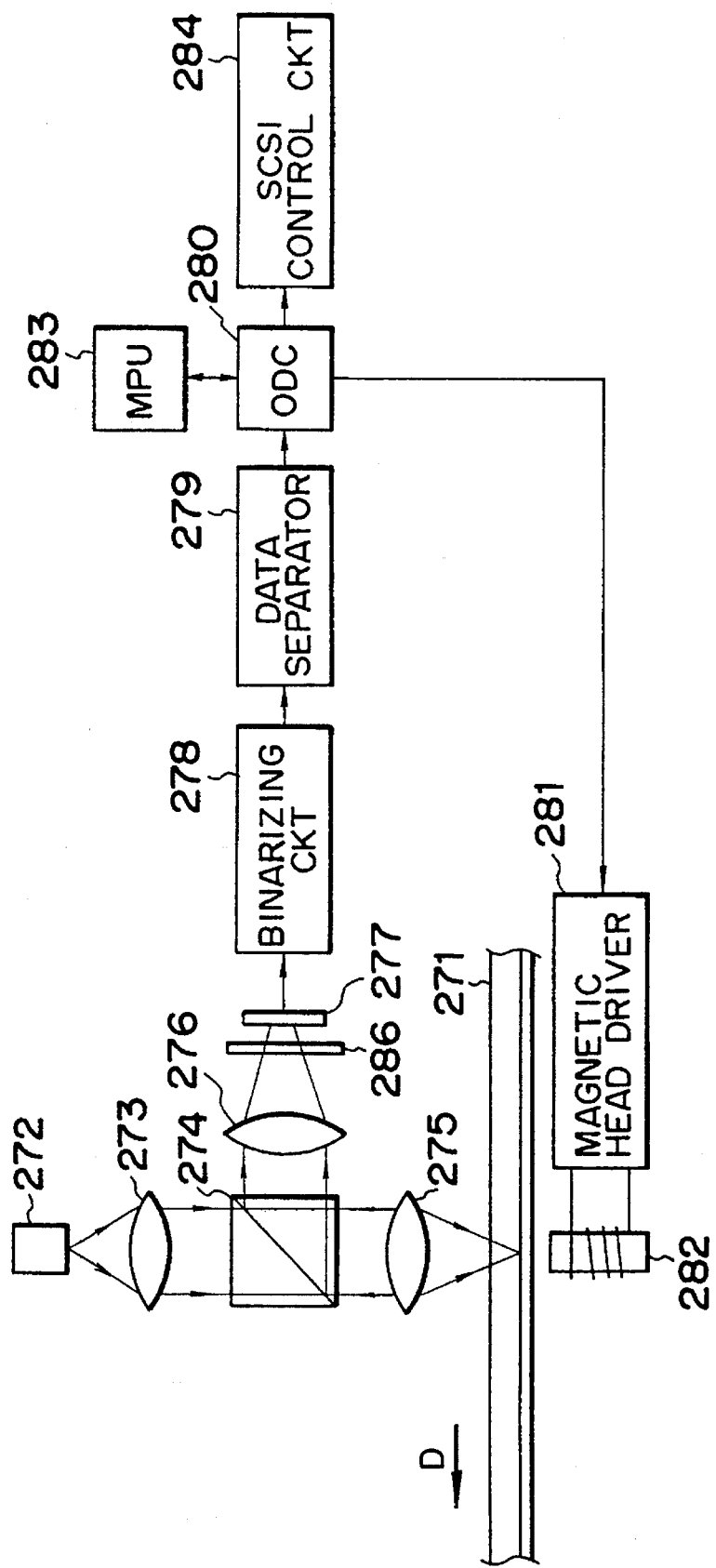

FIG. 12
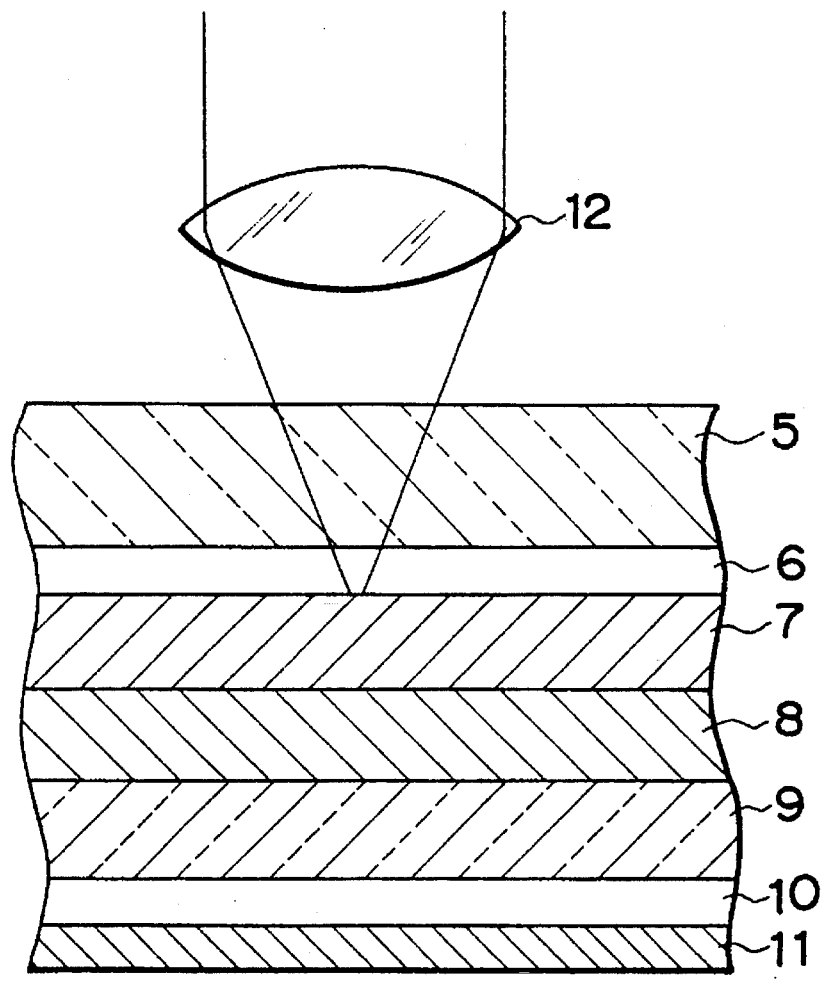
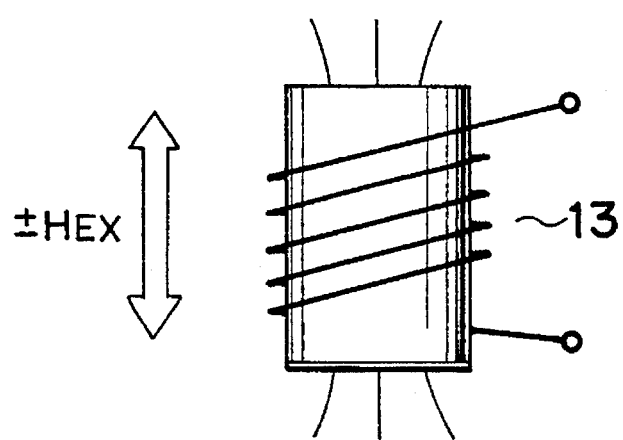

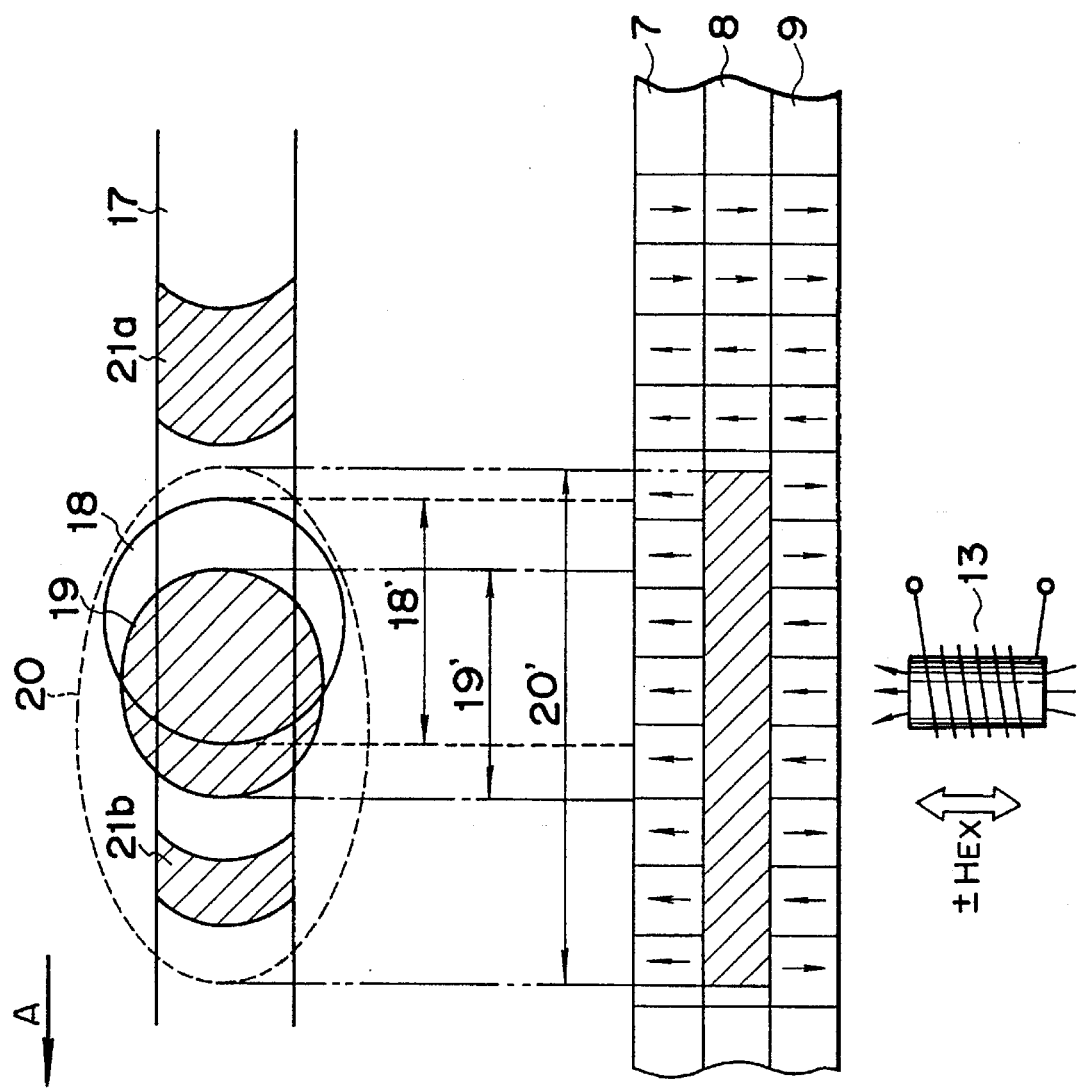

FIG. 27
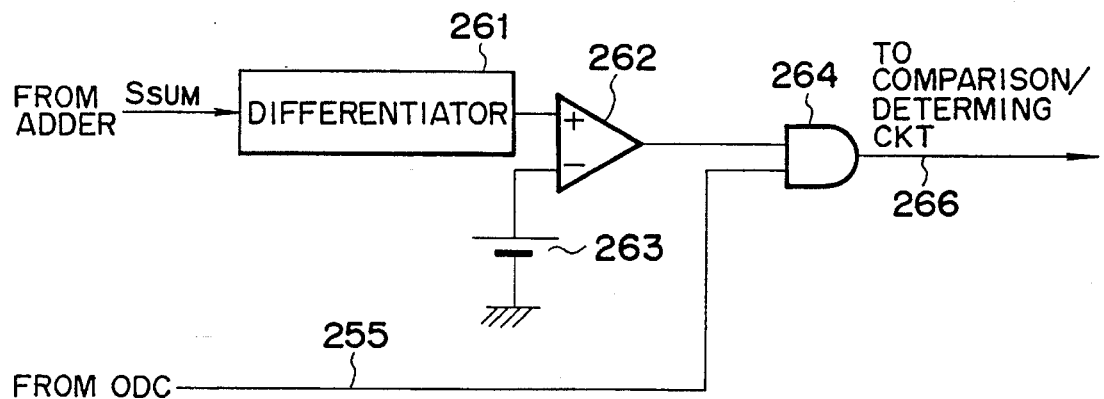
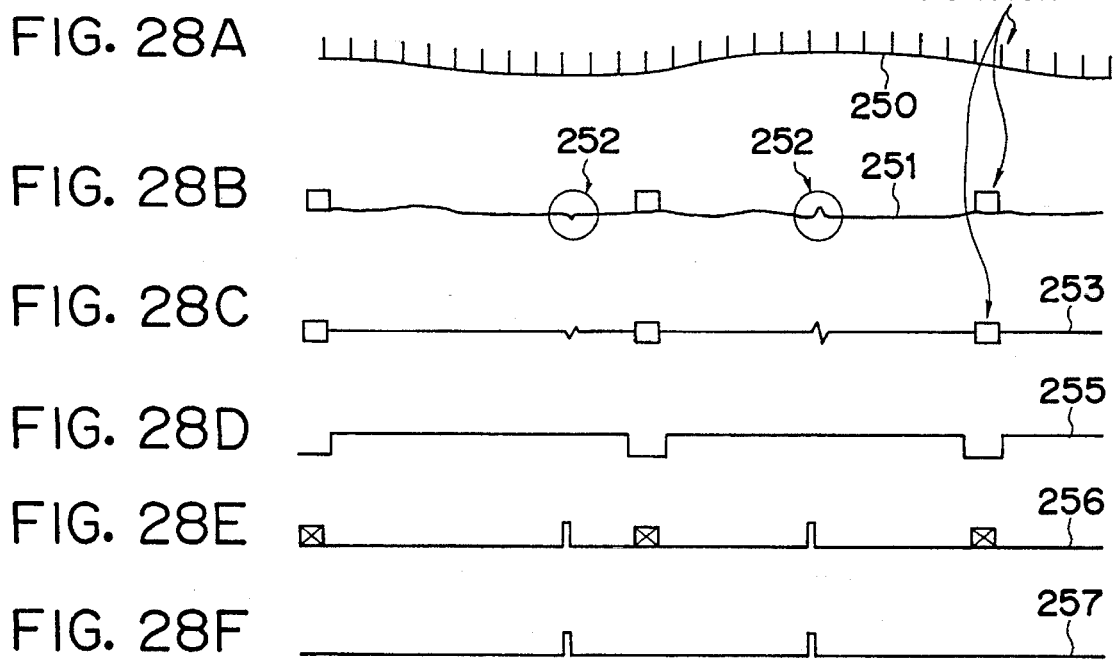

FIG. 29A
FIG. 29B
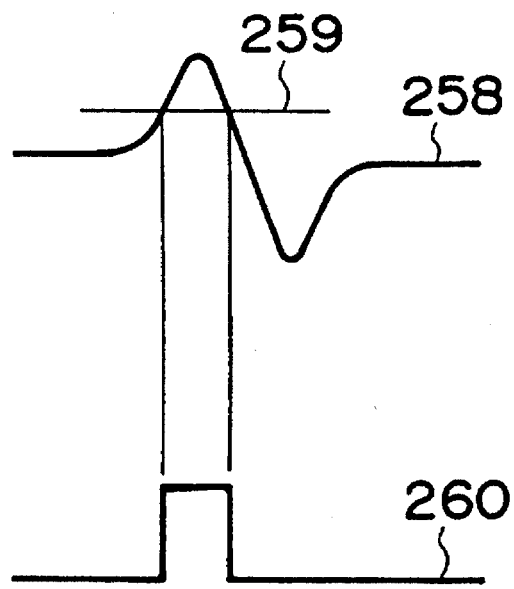
FIG. 29C

METHOD AND APPARATUS FOR VERIFYING RECORDING DATA AND FOR DETERMINING RECORDING ERROR USING A DETECTED LIGHT AMOUNT

BACKGROUND OF THE INVENTION

1. Field of the Invention

The present invention relates to a method of determining a recording error simultaneously with recording of data on a recording medium, and a data recording apparatus for executing this method.

2. Related Background Art

FIG. 1 shows an example of an optical head of a conventional magnetooptical recording/reproduction apparatus.

In FIG. 1, a semiconductor laser 22 serves as a light source. Divergent light emitted from the laser 22 is collimated via a collimator lens 23, and the light emerging from the lens 23 is guided to an objective lens 26 via a beam-shaping prism 24 and a polarizing beam splitter 25. The light is focused by the objective lens 26 to form a light spot on a magnetic layer of a magnetooptical recording medium 27. On the other hand, a magnetic head 28 applies an external magnetic field to the position of the light spot.

Light reflected by the magnetooptical recording medium 27 returns to the polarizing beam splitter 25 via the objective lens 26 again, and some light components of the reflected light are split by the splitter 25. The split light components are guided to a control optical system. In the control optical system, the split light components are further split into two beams by another polarizing beam splitter 29. One of the two split beams is guided to a reproduction optical system 30 to obtain a reproduction signal. The other beam is guided to a photodetector 38 via a focusing lens 36 and a half prism 37, and is guided further to a photodetector 40 via a knife edge 39, thereby obtaining auto-tracking and auto-focusing control signals for an optical head.

The reproduction optical system 30 comprises a half-wave plate 31 for rotating the direction of polarization of a beam through 45°, a focusing lens 32 for focusing a beam, a polarizing beam splitter 33 for splitting a beam into two beams, and photodetectors 34 and 35 for detecting the two beams split by the polarizing beam splitter 33. The reproduction signal can be obtained using differential detection signals output from these photodetectors 34 and 35.

FIG. 2 is a view for explaining how to obtain a magnetooptical signal.

A magnetooptical recording medium records information by utilizing a difference in direction of magnetization. When linearly polarized light is radiated onto the medium, the direction of polarization of the linearly polarized light rotates clockwise or counterclockwise depending on the difference in direction of magnetization.

For example, the direction of polarization of linearly polarized light incident on the magnetooptical recording medium is represented by a direction of a coordinate axis P shown in FIG. 2, reflected light for downward magnetization is represented by $R_+$ rotated through an angle $+\theta_K$, and reflected light for upward magnetization is represented by $R_-$ rotated through an angle $-\theta_K$. When an analyzer is arranged in a direction, as shown in FIG. 2, light A corresponds to the reflected light $R_+$ transmitted through the analyzer, and light B corresponds to the reflected light $R_-$ transmitted through the analyzer. When these light components are detected by a photodetector, information can be obtained as a difference in light intensity. In the prior art shown in FIG. 1, the polarizing beam splitter 33 serves as an analyzer. More specifically, the splitter 33 serves as an analyzer in a direction inclined from the axis P at an angle +45° for one of two split beams, and also serves as an analyzer in a direction inclined from the axis P at an angle −45° for the other beam. That is, since signal components obtained by the photodetectors 34 and 35 have opposite phases, a noise-reduced reproduction signal can be obtained by differentially detecting these signal components.

A magnetooptical recording/reproduction apparatus commercially available at present scans on an identical track three times upon recording of information. That is, the apparatus performs scanning for erasing previously recorded information, scanning for recording new information, and scanning for verifying whether or not new information is correctly recorded. The three scanning operations decrease the data transfer speed, and a demand has arisen for shortening the recording time.

As techniques for increasing the data transfer speed upon recording, the overwrite technique and direct verifying technique are known.

As the overwrite technique, a magnetic field modulation method and an optical modulation method are known.

In the magnetic field modulation method, as shown in FIG. 3, a magnetic head 41 and an objective lens 42 of an optical head are arranged to oppose each other to sandwich a magnetooptical recording medium 43 therebetween, and a magnetic field modulated according to a recording signal is applied by the magnetic head 41 in a state wherein a light spot having a predetermined intensity is radiated on the medium. The magnetooptical recording medium 43 used in the magnetic field modulation method has a structure wherein a protection & interference layer 47, a reproduction layer 46, a recording layer 45, and a protection layer 44 are stacked on a transparent substrate 48. FIG. 4 shows the characteristics of the coercive force with respect to the temperature of the recording layer 45 and the reproduction layer 46. In FIG. 4, the characteristics of the recording layer 45 are represented by a curve 49, and those of the reproduction layer 46 are represented by a curve 50. As can be seen from FIG. 4, the recording layer 45 has a large coercive force $H_{C49}$ at room temperature and a low Curie temperature $T_{C49}$, and the reproduction layer 46 has a smaller coercive force $H_{C50}$ at room temperature and a higher Curie temperature $T_{C50}$ than those of the recording layer 45. In FIG. 4, $T_{comp}$ represents the compensation temperature of the recording layer 45, $H_W$ represents the magnitude of the modulated magnetic field, $T_R$ represents the reproduction temperature, and $T_W'$ represents the lower limit of the overwrite temperature.

The recording operation based on the magnetic field modulation method will be described below with reference to FIGS. 5A to 5D. Assume that the magnetooptical recording medium 43 shown in FIG. 3 is moved in a direction of an arrow B. In the magnetic field modulation method, a light spot shown in FIG. 5A is radiated at a light intensity having a predetermined power $P_W$, as shown in FIG. 5C, thereby setting the temperature of a magnetic layer of the magnetooptical recording medium 43 to fall within a range between $T_W'$ and $T_{C50}$. In this temperature rise state, a magnetic field (FIG. 5B) modulated to $\pm H_W$ according to a recording signal is applied by the magnetic head 41 to the radiation portion of the light spot. Thus, the direction of magnetization of the recording layer 45 is aligned in the same direction as the direction of the modulated magnetic field, and a domain is formed, thus allowing an overwrite operation. In this case, since the coercive force of the reproduction layer 46 is smaller than that of the recording layer 45, a domain corresponding to that of the recording layer 45 is formed in the reproduction layer 46. The domain has an arrow-headed shape, as shown in FIG. 5D, and its length $W_m$ is determined by a length $W_m'$ of the modulated magnetic field.

On the other hand, in the optical modulation method, as shown in FIG. 6, an objective lens 53 of an optical head and a bias magnet 52 are arranged to oppose each other to sandwich a magnetooptical recording medium 54 therebetween, and a light spot whose intensity is modulated according to a recording signal is radiated from the optical head in a state wherein a magnetic field having a predetermined strength is applied from the bias magnet 52. The magnetooptical recording medium 54 used in the optical modulation method has a structure wherein a protection & interference layer 58, a recording layer 57, a recording auxiliary layer 56, and a protection layer 55 are stacked on a transparent substrate 59. An initializing magnet 51 is a magnet for initializing the recording auxiliary layer 56 of the magnetooptical recording medium 54.

FIG. 7 shows the characteristics of the coercive force with respect to the temperature of the recording auxiliary layer 56 and the recording layer 57. In FIG. 7, the characteristics of the recording auxiliary layer 56 are represented by a curve 60, and those of the recording layer 57 are represented by a curve 61. As can be seen from FIG. 7, the recording auxiliary layer 56 has a small coercive force $H_{C60}$ at room temperature, and a high Curie temperature $T_{C60}$. The recording layer 57 has a larger coercive force $H_{C61}$ at room temperature and a lower Curie temperature $T_{C61}$ than those of the recording auxiliary layer 56. In FIG. 7, $T_{comp}'$ represents the compensation temperature of the recording auxiliary layer 56, $H_{ini}$ represents the magnitude of the initializing magnetic field, $H_W'$ represents the magnitude of the bias magnetic field, $T_R'$ represents the reproduction temperature, and $T_{WL}$ and $T_{WH}$ respectively represent the low- and high-level temperatures upon optical modulation in an overwrite operation.

The recording operation based on the optical modulation method will be described below with reference to FIGS. 8A to 8D. Assume that the magnetooptical recording medium 54 shown in FIG. 6 is moved in a direction of an arrow C. In the optical modulation method, the recording auxiliary layer 56 is magnetized in one direction at room temperature by the magnetic field $H_{ini}$ of the initializing magnet 51. Then, when an information recording portion of the magnetooptical recording medium 54 passes the bias magnet 52, the bias magnetic field $H_W'$ is applied, as shown in FIG. 8B, and at the same time, a light spot shown in FIG. 8A is radiated from the optical head. The light intensity of the light spot is modulated to a low-level power $P_L$ and a high-level power $P_H$ according to a recording signal, as shown in FIG. 8C, and the temperatures at the information recording position are set to be $T_{WL}$ and $T_{WH}$, accordingly. In this case, when the light power is the high-level power $P_H$, since the temperature $T_{WH}$ of the recording auxiliary layer 56 exceeds the Curie temperature $T_{C60}$, the direction of magnetization of the recording auxiliary layer 56 is reversed to the direction of the bias magnetic field. When the light power is the low-level power $P_L$, the original direction of magnetization of the recording auxiliary layer 56 is maintained. In this manner, a domain is formed in the recording auxiliary layer 56, as shown in FIG. 8D, and is transferred to the recording layer 57 later upon cooling of a magnetic layer. The domain has a circular or elliptical shape.

With these overwrite techniques, erasing of previously recorded information and recording of new information can be attained by a single scanning operation.

The direct verifying technique is achieved in such a manner that two light spots are radiated onto a magnetooptical recording medium, the above-mentioned overwrite operation is performed using a leading light spot, and newly recorded information is immediately reproduced using a trailing light spot.

The conventional verifying method will be described in more detail below.

FIG. 9 is a schematic diagram showing an arrangement of a conventional magnetooptical disk apparatus. In FIG. 9, a magnetooptical disk 271 serves as a recording medium. The disk 271 is rotated by a motor (not shown), and is moved in a direction of an arrow D. An optical head and a magnetic head 282 are arranged at almost opposite positions to sandwich the disk 271 therebetween. The optical head includes a light source 272 such as a semiconductor laser, a collimator lens 273, a beam splitter 274, an objective lens 275, a focusing lens 276, an analyzer 286, a photodetector 277, and the like.

In the apparatus with the above-mentioned arrangement, a light beam emitted from the light source 272 is transmitted through the collimator lens 273 and the beam splitter 274, and is focused on a recording layer (magnetic film) of the magnetooptical disk 271 by the objective lens 275. In the light beam radiated portion of the magnetic film, the temperature is increased to a value near the Curie temperature of the magnetic film, and the coercive force is decreased. The magnetic head 282 applies a magnetic field in a direction perpendicular to the film surface to a portion near the light beam radiated portion of the magnetic film. The direction of magnetization of the portion with the decreased coercive force upon radiation of the light beam is aligned in the same direction as that of the applied magnetic field. The magnetic field to be applied from the magnetic head 282 is controlled by a magnetic head driver 281 to reverse its direction according to data to be recorded. Therefore, data is recorded on the portion scanned with the light beam upon movement of the disk 271 as a series of domains having upward magnetization and downward magnetization.

The data recorded as described above is read out after recording, and is subjected to error detection. Whether or not recording is performed normally is determined according to the number of detected errors. Such an operation is normally called "verification". When a recording error is determined by verification, data is re-recorded on a recording error portion or a portion different from the recording error portion.

In the verification, the light source 272 of the optical head emits a light beam having a lower power than that in recording, and the data recording portion on the disk 271 is scanned by this light beam. The direction of polarization of the light beam reflected by the disk 271 is modulated according to recorded data on the basis of a magnetooptical effect such as the Kerr effect. This reflected light is split by the beam splitter 274 from the optical path of the radiation beam, and is focused by the focusing lens 276. The reflected light transmitted through the focusing lens 276 is converted into light intensity-modulated according to the recorded data via the analyzer 286, and the converted light is detected by the photodetector 277. The output signal from the photodetector 277 is binarized by a binarizing circuit 278, and the binary data is input to a magnetooptical disk drive controller (to be abbreviated to as an ODC hereinafter) 280 via a data separator 279. The ODC 280 is connected to a microprocessor unit (MPU) 283 and a small computer system interface (SCSI) control circuit 284. In the ODC 280, errors of data read out from the disk are checked. When the number of errors is equal to or smaller than a predetermined determination criterion, the recording operation is ended. However, when the number of errors exceeds the determination criterion, a recording error is determined, and the ODC 280 instructs the device to perform re-recording of data, and the like.

FIG. 10 is a block diagram showing an arrangement of the ODC. The ODC performs data flow control, modulation, demodulation, synchronous processing, and the like, and an error correction code (ECC) circuit generates a parity in recording so as to correct an error generated in data and corrects, in reproduction, the error in data read out from the disk using the parity generated in recording.

In FIG. 10, the ODC is connected to the above-mentioned SCSI control circuit 284 by a DMA interface (I/F) 224 via a DMA controller 225. The ODC is also connected to the above-mentioned MPU 283 by an MPU-I/F 221 via an MPU-I/F circuit 222. The ODC also includes an ECC circuit 226, a DRAM controller 283, a buffer RAM 284, and a formatter circuit 227. These units are connected to each other via an internal bus 223. The formatter circuit 227 includes a synchronous signal generating circuit, a synchronous signal detection circuit, a modulation circuit, and a demodulation circuit.

When data is recorded in the apparatus shown in FIGS. 9 and 10, the ECC circuit 226 adds an error correction code to data sent from the SCSI control circuit 284. The data added with the error correction code is encoded to a recording code by the formatter circuit 227, and the recording code is added with a synchronous signal, which is required in reproduction. Thus, the recording code is sent to the magnetic head driver 281 as a recording signal 228. The magnetic head driver 281 drives the magnetic head 282 according to the input recording signal 228, thereby recording data on the magnetooptical disk 271.

When verification is performed, the data recorded portion of the disk is scanned with a light beam again, as described above, and a recorded signal is read out by the photodetector 277. The readout signal is binarized by the binarizing circuit 278, and the data separator 279 extracts a reproduction signal 229 from the binary data in synchronism with clocks. The extracted reproduction signal 229 is supplied to the formatter circuit 227 in the ODC 280, and various synchronous signals are detected by the synchronous signal detection circuit. The reproduction signal 229 is separated into data and synchronous signals, and only data is input to the ECC circuit 226. The synchronous signals to be used are each constituted by a pattern having a certain redundancy so as to be able to be detected even if they include errors more or less. Even when the synchronous signals are not detected, data can be normally reproduced by, e.g., interpolation.

The ECC circuit 226 performs a syndrome calculation of the input data to detect errors. The ECC circuit 226 counts the number of detected errors. When the number of errors is equal to or smaller than the predetermined determination criterion, the ECC circuit determines that recording is normally performed; otherwise, it determines that a recording error occurred.

On the other hand, in place of performing recording and verification by scanning a light beam on the disk twice, as described above, a so-called direct verifying method for performing verification simultaneously with recording is proposed. As the direct verifying method, a method using a plurality of light beams, as described in Japanese Laid-Open Patent Application No. 58-17546 and a method using reflected light of a recording light beam, as described in Japanese Laid-Open Patent Application No. 62-54857 or 3-73448 are known.

When the above-mentioned method of determining a recording error is applied to the direct verifying method using a plurality of light beams, the following problems are posed. That is, in the direct verifying method, verification is achieved in such a manner that a recording/reproduction light beam and a verifying light beam are arranged to be separated at a predetermined distance in the scanning direction of the light beams. Data recorded by the leading recording/reproduction light beam is read out by the trailing verifying light beam, and the readout data is compared with data delayed by a time corresponding to the predetermined distance. When the timing between the readout data and delayed data is shifted due to, e.g., a variation in rotation speed of the disk, verification cannot be normally performed.

When optical adjustment is performed to optimize the focusing state of the recording/reproduction light beam of the plurality of light beams, the focusing state of the verifying light beam becomes inferior to that of the recording/reproduction light beam due to various aberrations such as a curvature of field of an optical system. The signal-to-noise (S/N) ratio of a signal read out by the verifying light beam in such a focusing state is decreased by about 2 dB as compared to that of a signal reproduced by the recording/reproduction light beam. When the initial performance of the disk and the apparatus is maintained, the decrease in S/N ratio poses no problem. However, in consideration of a change as a function of time, in the worst case, a recording state, which is satisfactory in normal reproduction, may be determined as an error in verification.

For example, when a long distance code (LDC) is used in ECC, a byte error rate before correction, which is necessary for satisfying an error rate of $1 \times 10^{-12}$ after error correction is about $2 \times 10^{-3}$. This value corresponds to a reproduction limit using the recording/reproduction light beam after passage of time. In contrast to this, the error rate of data read out by the verifying light beam is worsened by 2 dB, as described above, and is about $7 \times 10^{-3}$. With this value, if the number of data per sector is 639 bytes, 4 to 5 errors occur per sector even if a disk has no defects. As a result, a sector that does not pose any problem in normal recording may be determined to be defective sector.

On the other hand, when verification is performed using a recording light beam reflected by a disk, data read out by the reflected light represents data which should be recorded in principle, and it is difficult to detect errors due to defects on the disk. When defects are present on the disk in practice, they are overlooked with high possibility. Therefore, when recording error determination is performed by the verifying method using the recording light beam reflected by the disk, the determination result of verification becomes better than an actual recording state contrary to the case wherein a plurality of light beams are used.

SUMMARY OF THE INVENTION

It is an object of the present invention to solve the conventional problems, and to provide a recording determination method which can precisely determine a recording error and a data recording apparatus for executing this method.

In order to achieve the above object, according to the present invention, there is provided a recording determination method comprising the steps of:

recording information by radiating a light beam onto an information recording medium;

detecting a light amount of the light beam reflected by the medium simultaneously with recording of the information; and detecting a defect on the medium by comparing the detected light amount with a reference value.

In order to achieve the above object, there is also provided a data recording apparatus comprising:

recording means for recording information by radiating a light beam onto an information recording medium;

means for detecting a light amount of the light beam reflected by the medium simultaneously with recording of the information; and defect detection means for detecting a defect on the medium by comparing the detected light amount with a reference value.

According to one aspect of the present invention, there is provided a recording determination method comprising the steps of:

adding a synchronous signal to recording data;

recording the recording data added with the synchronous signal by scanning an optical recording medium with a first light beam;

reading out the synchronous signal and the data by scanning the medium with a second light beam following the first light beam simultaneously with recording of the recording data;

delaying the recording data; and detecting an error by adjusting a timing of the delayed recording data on the basis of the readout synchronous signal, and comparing the recording data with the readout data.

According to one aspect of the present invention, there is provided a data recording apparatus comprising:

means for recording recording data added with a synchronous signal by scanning an optical recording medium with a first light beam;

means for reading out the synchronous signal and the data by scanning the medium with a second light beam following the first light beam simultaneously with recording of the recording data;

a delay and timing adjusting circuit for delaying the recording data, and outputting the delayed recording data at a timing on the basis of the readout synchronous signal; and an error detection circuit for detecting an error by comparing the data output from the delay and timing adjusting circuit with the readout data.

According to another aspect of the present invention, there is provided a recording determination method comprising the steps of:

recording data on a recording medium;

reading out the recorded data from the medium simultaneously with recording;

detecting an error of the readout data;

detecting a defect on a portion where the data is recorded; and determining a recording error on the basis of both an error detection result and a defect detection result.

According to another aspect of the present invention, there is provided a data recording apparatus comprising:

means for recording data on a recording medium;

means for reading out the recorded data from the medium simultaneously with recording;

means for detecting an error of the readout data;

means for detecting a defect of a portion where the data is recorded; and determining means for determining a recording error on the basis of both an error detection result and a defect detection result.

BRIEF DESCRIPTION OF THE DRAWINGS

FIG. 9 is a schematic diagram showing an arrangement of a conventional magnetooptical disk apparatus;

FIG. 12 is a schematic sectional view showing the structure of a magnetooptical recording medium used in the present invention;

FIGS. 17A and 17B are views showing a light spot and the direction of magnetization of magnetic layers in the present invention;

FIG. 27 is a block diagram showing an arrangement of a disk defect detection circuit in the circuit shown in FIG. 26;

FIGS. 28A to 28F are waveform charts showing signal waveforms in the respective sections of the circuit shown in FIG. 27;

FIGS. 29A to 29C are enlarged views of waveforms for explaining a defect detection state in the circuit shown in FIG. 26;

DETAILED DESCRIPTION OF THE PREFERRED EMBODIMENTS

Figure 11:
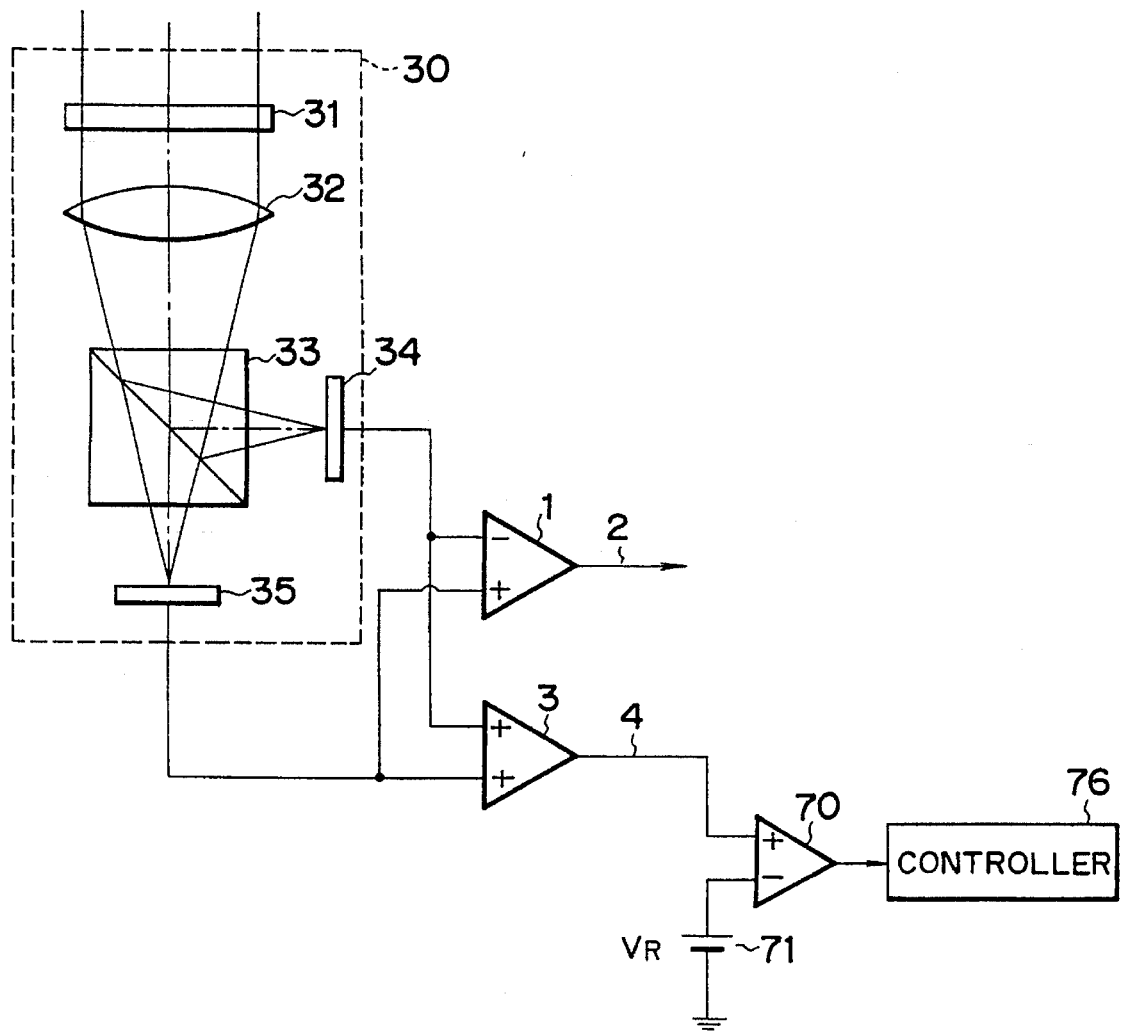
FIG. 11 is a schematic diagram showing a detection unit of a data recording apparatus according to the first embodiment of the present invention.

FIG. 11 is a schematic diagram showing a detection system of a data recording apparatus according to the first embodiment of the present invention. In FIG. 11, a reproduction optical system 30 is similar to that shown in FIG. 1, and the arrangement of this embodiment is the same as that in the prior art shown in FIG. 1, except for the optical system 30. The optical system 30 comprises a half-wave plate 31 for rotating the direction of polarization of light reflected by a magnetooptical recording medium through 45°, a focusing lens 32 for focusing a light beam, a polarizing beam splitter 33 for splitting a light beam into two beams, and photodetectors 34 and 35 for respectively detecting the two split beams. An amplifier i detects a difference signal between the signals obtained by the photodetectors 34 and 35, and its output 2 serves as a signal representing the polarization state of reflected light. In reproduction, this signal becomes a reproduction signal, as has been described above with reference to FIG. 2. An amplifier 3 detects a sum signal of the signals obtained by the photodetectors 34 and 35, and its output 4 serves as a signal representing the reflectance of the magnetooptical recording medium since it corresponds to the total light amount.

The output signal 4 from the amplifier 3 is compared with a voltage $V_R$ supplied from a power supply 71 and corresponding to a reference value by a comparator 70, and a defect detection signal is input to a controller 76. When the number of defects detected per predetermined information amount, e.g., the number of defects per sector, exceeds a predetermined level, the controller 76 controls the apparatus to re-record the same information on another portion of the medium.

A method of detecting the total light amount of light reflected by the magnetooptical recording medium in recording, and detecting defects on the medium by checking a change in reflectance of the magnetooptical recording medium using the detection system shown in FIG. 11 will be described below.

If the magnetooptical recording medium has no defects caused by corrosion, scratches, or dust, domains are normally formed. The magnetooptical recording medium has almost a constant reflectance within a use temperature range regardless of the state of magnetization of a magnetic layer. However, when the properties of the magnetic layer change due to, e.g., corrosion, the reflectance of the changed portion undesirably becomes lower or higher than that of a surrounding portion. When scratches are formed on the magnetooptical recording medium or dust becomes attached to the medium, a light spot is disturbed, and the reflectance is apparently decreased. Therefore, defects caused by corrosion, scratches, or dust on the magnetooptical recording medium can be-detected by detecting the reflectance.

The recording in the magnetic field modulation overwrite method described above with reference to FIGS. 3 to 5D is realized in such a manner that a light spot of a constant power is radiated onto a magnetooptical recording medium, and an external magnetic field is modulated according to recording information, thereby forming domains on a recording layer. In this magnetic field modulation method, the output signal 4 shown in FIG. 11 is normally detected as a signal of a constant level. However, if a defect is present on a recorded portion, the signal fluctuates according to the size of the defect. Based on the degree of fluctuation of the signal, whether a domain is normally recorded, or a domain is not locally recorded but information can be reproduced upon execution of error correction processing, or no domain is recorded and information cannot be reproduced even by the error correction processing can be determined. When information cannot be reproduced, it is re-recorded on another portion of the medium. When information can be reproduced upon execution of error correction, information is re-recorded on another portion of the medium if the frequency of such fluctuation exceeds a predetermined value. When the fluctuation of the signal falls within an allowable range, it is determined that a domain is normally recorded, and information is sequentially recorded.

Figure 13A:
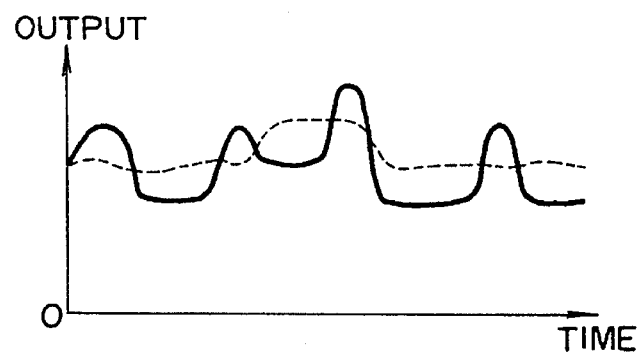
FIGS. 13A to 13E are waveform charts showing signal waveforms in the respective sections shown in FIG. 11.
Figure 13B:
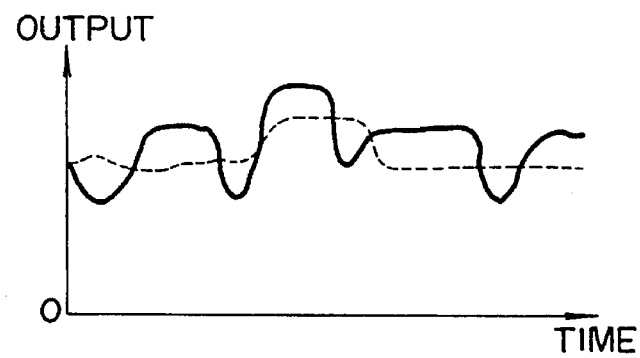
Figure 13C:
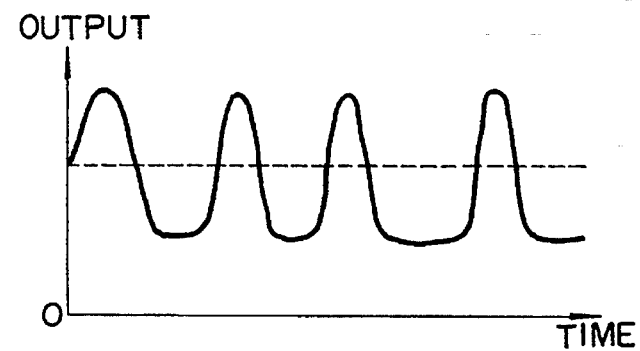
Figure 13D:
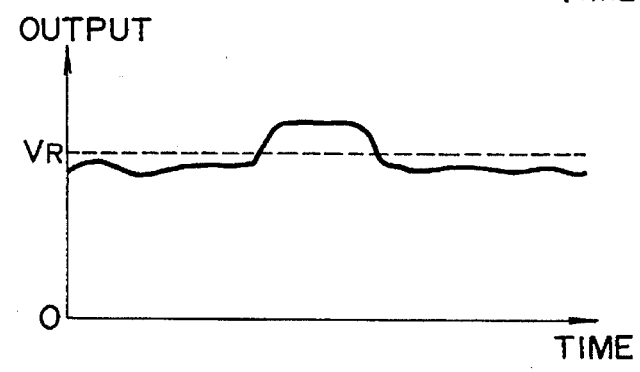
Figure 13E:

The defect detection state in the magnetic field modulation overwrite method will be described below with reference to signal waveforms shown in FIGS. 13A to 13E. In the detection system shown in FIG. 11, the photodetectors 34 and 35 respectively output signals indicated by solid waveforms in FIGS. 13A and 13B, which signals are obtained by superposing information signals on reflected light amount components indicated by broken waveforms in FIGS. 13A and 13B. In these output signals, the reflected light amount components are in phase with each other, whereas the information signal components have phases inverted from each other in FIGS. 13A and 13B. For this reason, the differential amplifier 1 outputs an information signal, in which the reflected light amount components cancel each other, and the amplitude is doubled, as shown in FIG. 13C. On the other hand, the summing amplifier 3 outputs a signal, in which the information signal components cancel each other, and corresponds to the reflected light amount, as shown in FIG. 13D. This signal is compared with the output voltage $V_R$ from the power supply 71, which voltage corresponds to the upper limit of the reflected light amount from a medium in a normal state, thus obtaining a defect detection signal, a high level of which indicates a defect, as shown in FIG. 13E.

Figure 15:
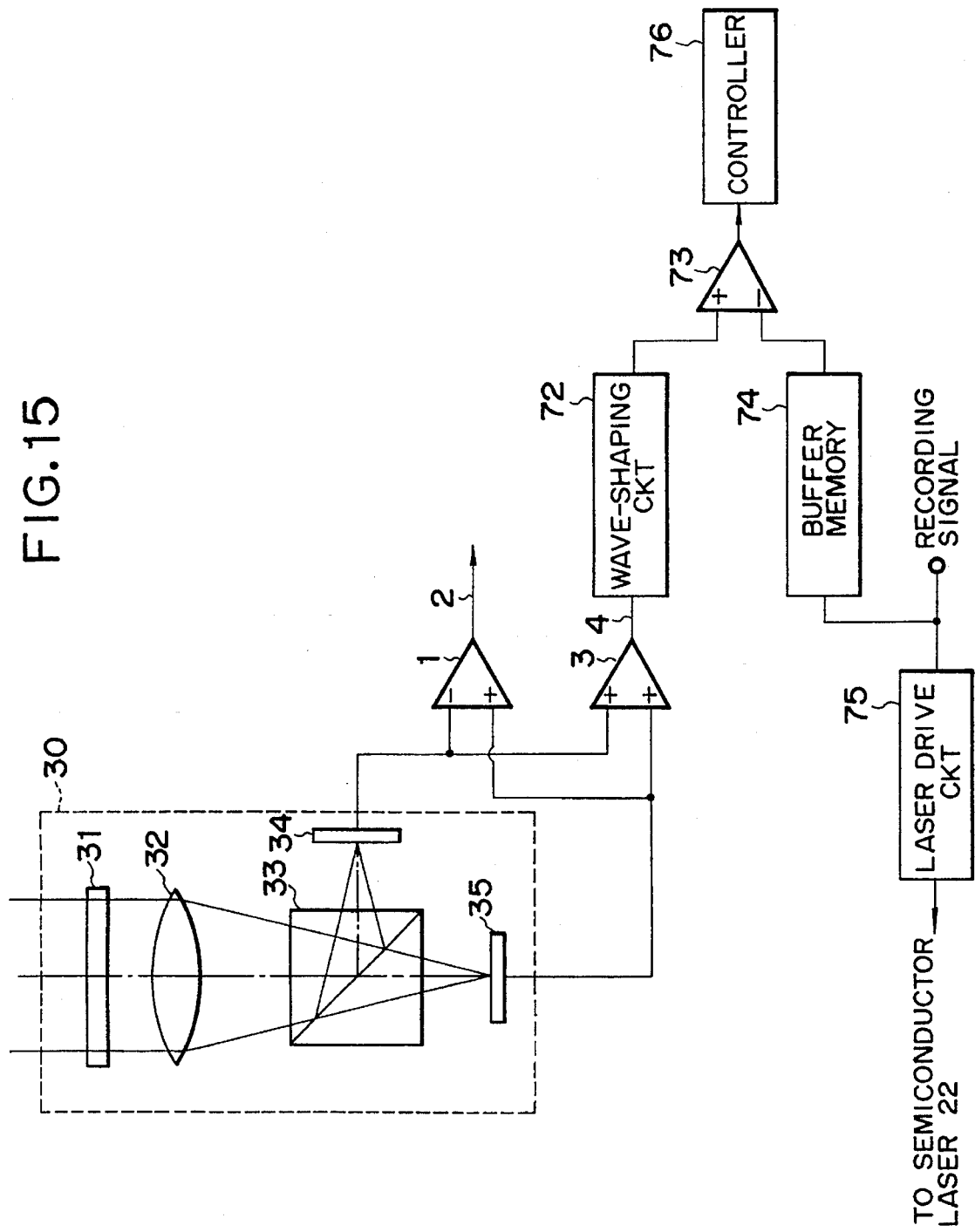
FIG. 15 is a schematic diagram showing a detection unit of a data recording apparatus according to the second embodiment of the present invention.

The recording in the optical modulation method described above with reference to FIGS. 6 to 8D is achieved in such a manner that a light spot is radiated by switching its intensity between low and high levels according to recording information in a state wherein a predetermined bias magnetic field is applied to a magnetooptical recording medium, so as to form domains in a recording auxiliary layer, and the domains are transferred to a recording layer upon cooling. In this optical modulation method, since a light spot having powers of two values, i.e., low and high levels, is radiated, an output signal 4 shown in FIG. 15 is normally detected as a signal having two values in the same manner as in a recording signal. Since the waveform can be detected beforehand from recording information, fluctuation of the signal is detected as a difference from the waveform.

FIG. 15 is a schematic diagram showing a detection system of a data recording apparatus according to the second embodiment of the present invention, which adopts the optical modulation method. The same reference numerals in FIG. 15 denote the same parts as in FIG. 11, and a detailed description thereof will be omitted. This embodiment also has substantially the same arrangement as that of the prior art shown in FIG. 1, except for an optical system 30.

In FIG. 15, a recording signal is supplied to a laser drive circuit 75 to drive a semiconductor laser 22 (FIG. 1), and at the same time, is stored in a buffer memory 74. An output signal 4 from a summing amplifier 3 is input to a comparator 73 via a wave-shaping circuit 72. The buffer memory 74 sequentially outputs the stored information signal in synchronism with the output from the wave-shaping circuit 72. The comparator 73 compares the output from the buffer memory 74 with the output from the wave-shaping circuit 72, and supplies a defect detection signal to a controller 76. Like in the first embodiment, when the number of defects detected per predetermined information amount, e.g., the number of defects per sector, exceeds a predetermined level, the controller 76 controls the apparatus to re-record the same information on another portion of the medium.

Figure 16A:
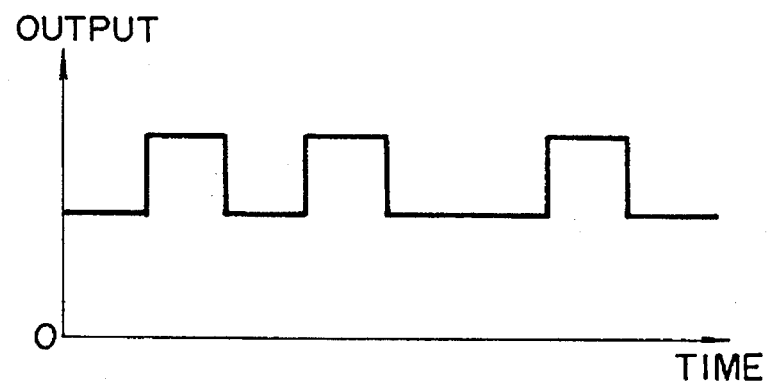
FIGS. 16A to 16D are waveform charts showing signal waveforms in the respective sections shown in FIG. 15.
Figure 16B:
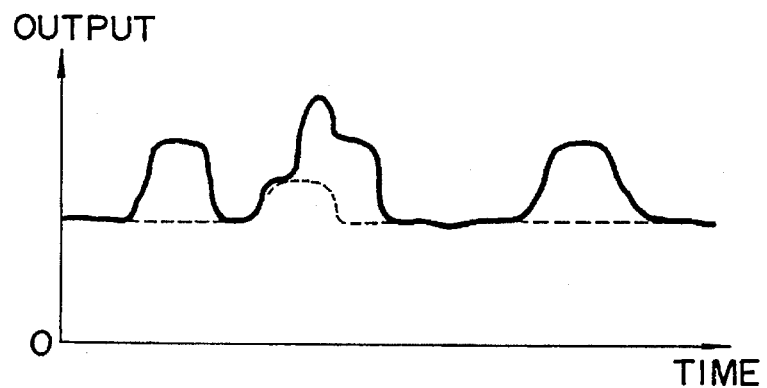
Figure 16C:
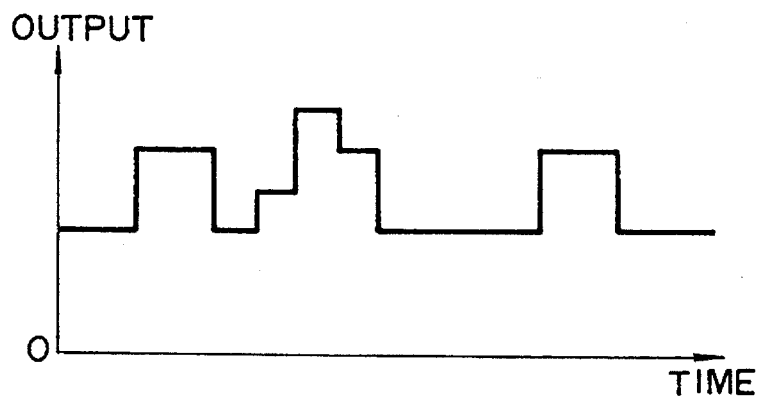
Figure 16D:

The defect detection state in the optical modulation method will be described below with reference to signal waveforms shown in FIGS. 16A to 16D. A recording signal consists of a binary signal, which repeats high and low levels according to information, as shown in FIG. 16A. The intensity of a light beam to be radiated onto the medium is also modulated in correspondence with the recording signal. On the other hand, a reflected light amount signal output from the summing amplifier 3 has a waveform indicated by a solid curve, which waveform is obtained by multiplying a component corresponding to a change in reflectance of the medium indicated by a broken curve with the intensity of the light beam to be radiated onto the medium, as shown in FIG. 16B. This signal is wave-shaped by the wave-shaping circuit 72, and a signal shown in FIG. 16C is output. The signal shown in FIG. 16C is compared with the recording signal (FIG. 16A) stored in the buffer memory 74 in synchronism with the recording signal, thus obtaining a defect detection signal, which has a high-level portion corresponding to a defect having a higher reflectance than that of the remaining portion, as shown in FIG. 16D.

As described above, defects can be detected by detecting a shift in reflectance from a predetermined value. Furthermore, recording precision can be further improved by detecting whether or not magnetooptical characteristics have nonuniformity due to unevenness of a magnetic layer.

FIG. 12 shows the structure of a magnetooptical recording medium, which is suitable for the direct verifying method on the basis of the detection result of a difference in reflectance of the medium, and the detection result of nonuniformity in magnetooptical characteristics. In FIG. 12, the magnetooptical recording medium has a structure wherein a protection layer 6, a reproduction layer (first magnetic layer) 7, an adjustment layer 8, a recording layer (second magnetic layer) 9, a protection layer 10, and a reflection layer 11 are stacked on a transparent substrate 5. An objective lens 12 of an optical head and a magnetic head 13 are arranged at opposite positions to sandwich the magnetooptical recording medium therebetween.

Figure 14:
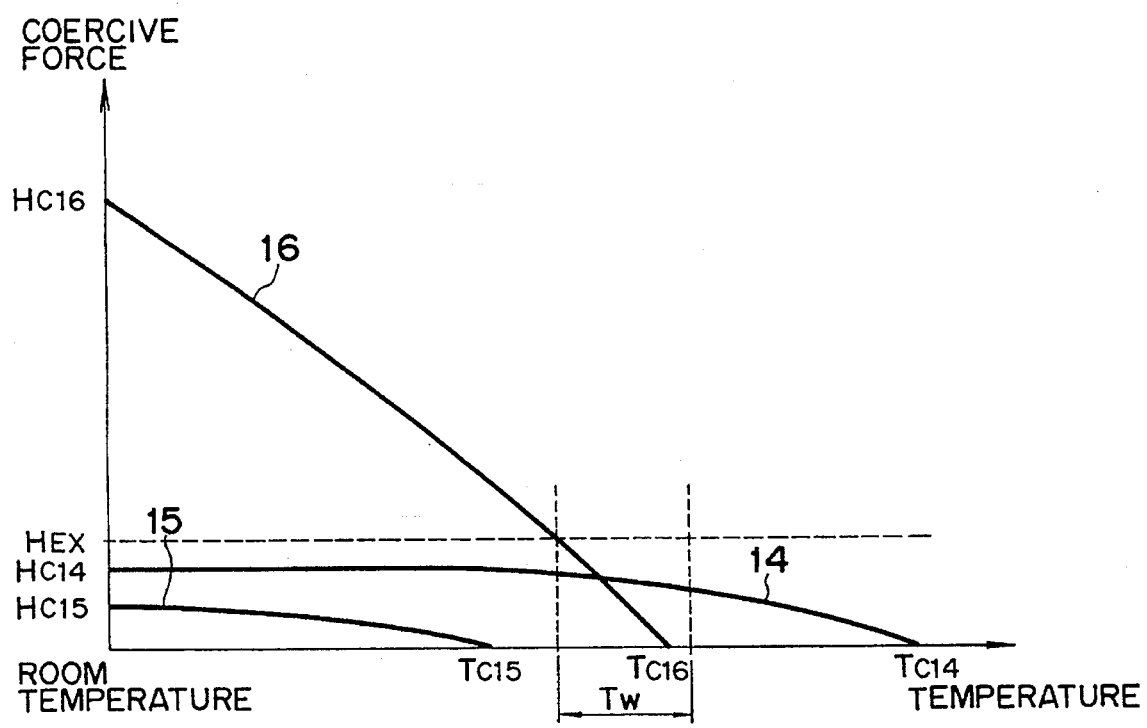
FIG. 14 is a graph showing the characteristics of magnetic layers of the medium shown in FIG. 12.

FIG. 14 shows the characteristics of the coercive force with respect to the temperature of the reproduction layer 7, the adjustment layer 8, and the recording layer 9 of the magnetooptical recording medium shown in FIG. 12. In FIG. 14, the characteristics of the reproduction layer 7 are represented by a curve 14, those of the adjustment layer 8 are represented by a curve 15, and those of the recording layer 9 are represented by a curve 16. As can be apparent from FIG. 14, the reproduction layer 7 has a small coercive force $H_{C14}$ at room temperature and a high Curie temperature $T_{C14}$. The recording layer 9 has a large coercive force $H_{C16}$ at room temperature and a low Curie temperature $T_{C16}$. The adjustment layer 8 has a smaller coercive force $H_{C15}$ at room temperature and a lower Curie temperature $T_{C15}$ than those of other layers. In FIG. 14, $H_{EX}$ represents the magnitude of an external magnetic field applied in recording. $T_W$ represents the temperature range of the magnetic layer near a light spot in recording. The temperature $T_W$ is near the Curie temperature $T_{C16}$ of the recording layer 9.

An exchange coupling force between the reproduction layer 7 and the recording layer 9, and the function of the adjustment layer 8 will be explained below. Assume that the temperatures of the magnetic layers in reproduction are lower than the Curie temperature $T_{C15}$ of the adjustment layer 8. In this case, magnetization of the adjustment layer 8 exists as perpendicular magnetization. For this reason, the exchange coupling force between the recording layer 9 and the reproduction layer 7 is strengthened, and domains recorded on the recording layer 9 are transferred to the reproduction layer 7. The temperatures of the magnetic layers in recording are increased up to the temperature range $T_W$. In this case, since the temperature of a portion near the light spot exceeds the Curie temperature $T_{C15}$ of the adjustment layer 8, the magnetization of the adjustment layer 8 disappears. For this reason, the exchange coupling force between the recording layer 9 and the reproduction layer 7 is blocked. Therefore, when an external modulated magnetic field $\pm H_{EX}$ larger than the coercive force of the reproduction layer 7 is applied, the direction of magnetization of the reproduction layer 7 is aligned in the same direction as the direction of the external modulated magnetic field.

Figure 1:
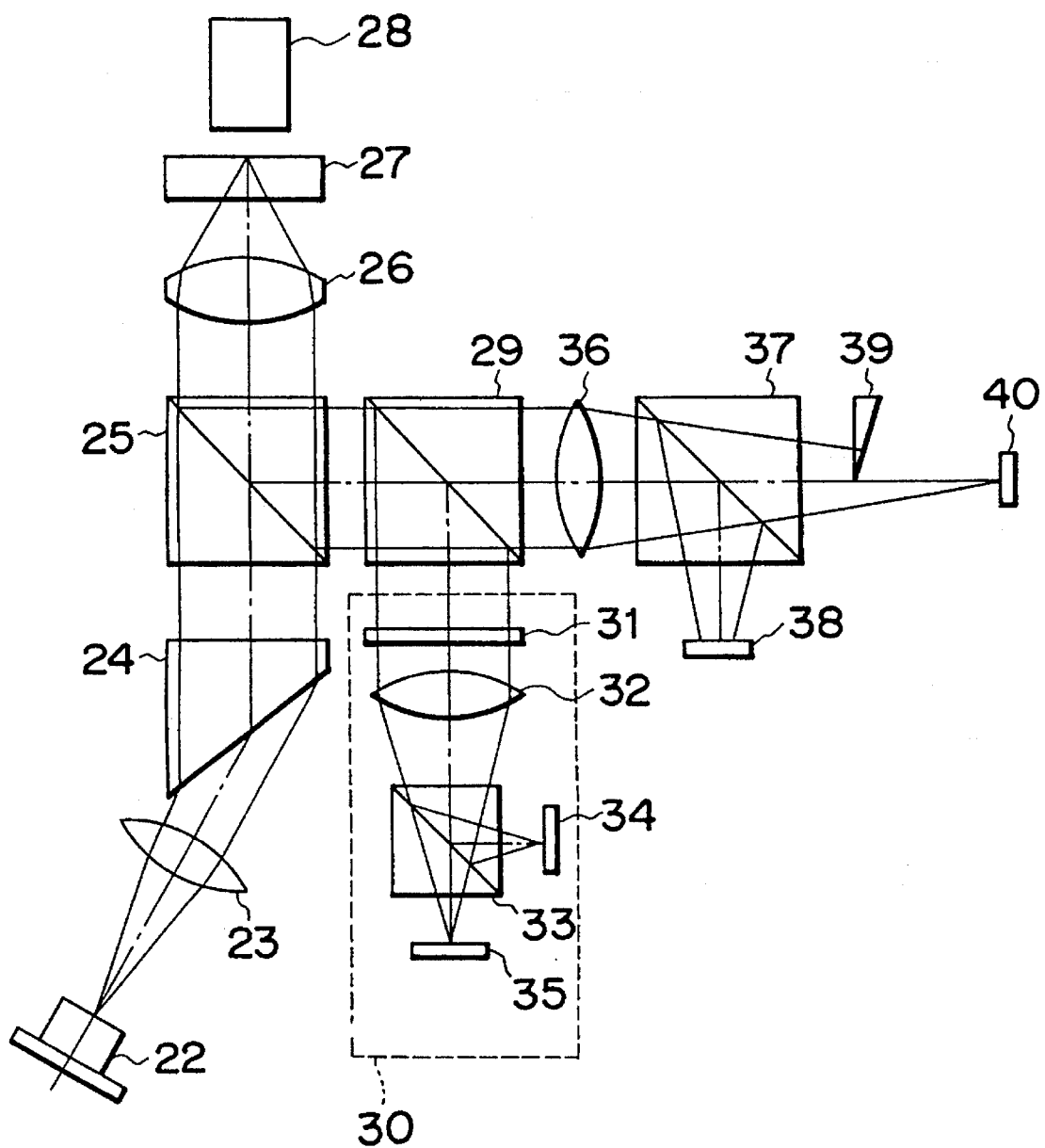
FIG. 1 is a schematic view showing a conventional magnetooptical recording/reproduction apparatus.
Figure 2:
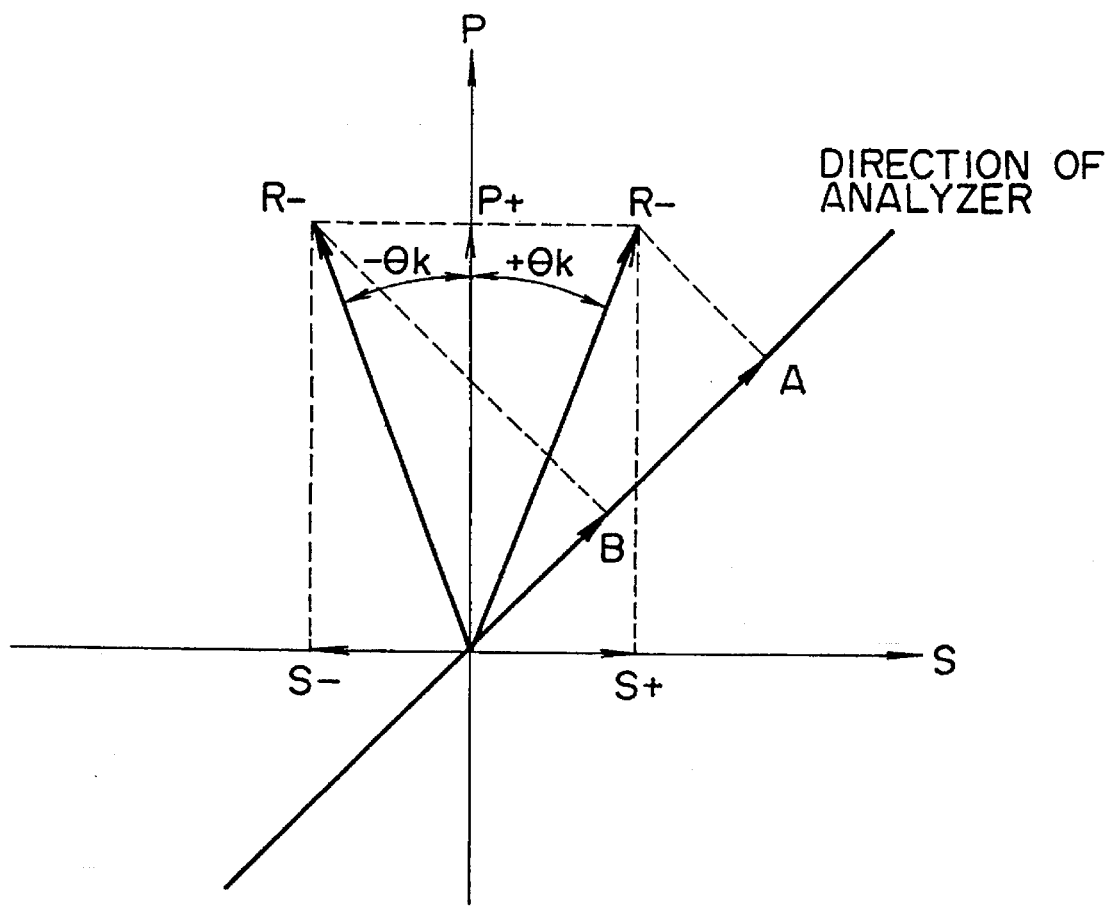
FIG. 2 is a view for explaining the principle of reproduction of magnetooptical data.
Figure 3:
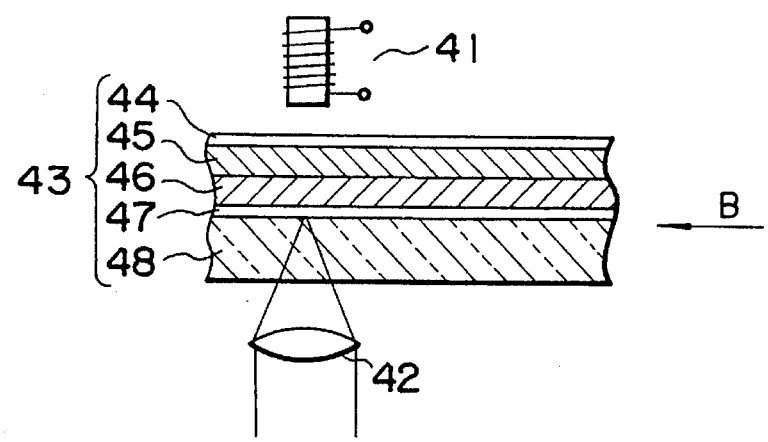
FIG. 3 is a schematic view for explaining the structure of a magnetooptical recording medium and the arrangement of a recording apparatus in a conventional magnetic field modulation method.
Figure 4:
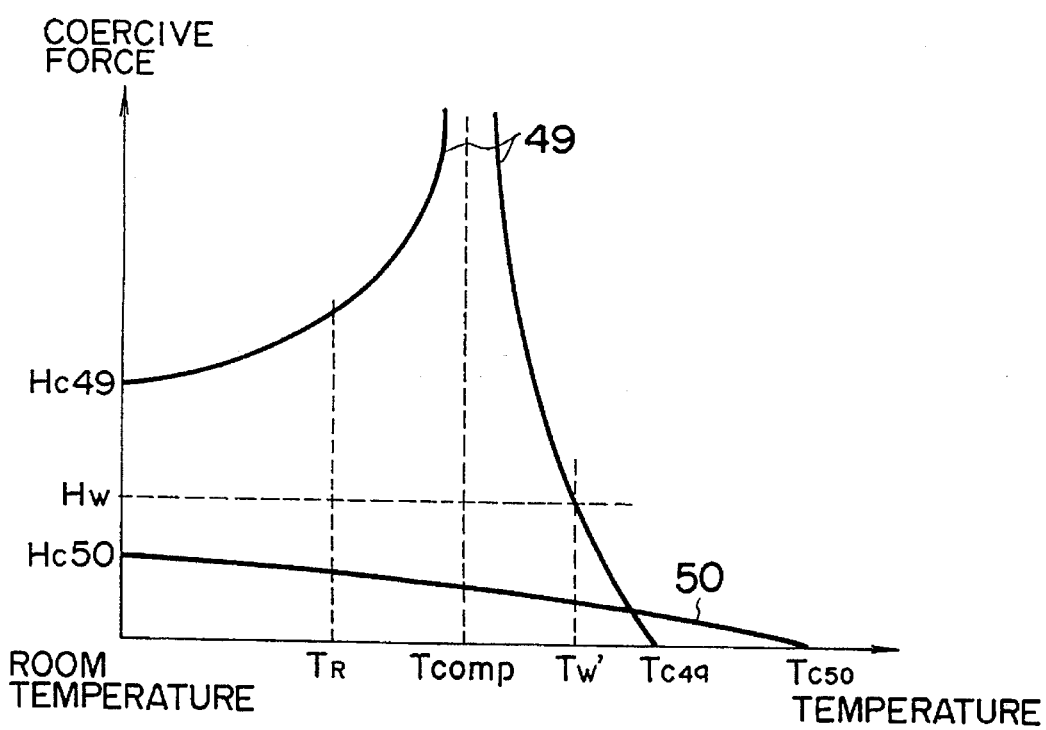
FIG. 4 is a graph showing the characteristics of magnetic layers of the magnetooptical recording medium shown in FIG. 3.

The overwrite operation and the direct verifying operation for the magnetooptical recording medium will be described below with reference to FIGS. 17A and 17B. As an optical head and a magnetic head, the heads equivalent to those shown in FIG. 1 are used. As a detection system, the system shown in FIG. 11 is used. FIG. 17A is a plan view of a portion of the magnetooptical recording medium, and FIG. 17B is a sectional view of FIG. 17A.

In FIGS. 17A and 17B, information is recorded on a track 17 on the magnetooptical recording medium. Assume that the magnetooptical recording medium is moved in a direction of an arrow A. In recording, a light spot is radiated on a region 18 (18'). The temperatures of the magnetic layers are increased by the light spot 18. In a region 20 (20'), the exchange coupling force is blocked since the temperatures of the magnetic layer fall within the temperature range $T_W$ shown in FIG. 14. As described above, in this exchange coupling force blocking region, the magnetization of the adjustment layer 8 disappears, and the exchange coupling force between the reproduction layer 7 and the recording layer 9 is blocked. In a high-temperature region 19 (19') falling within the temperature range $T_W$, the direction of magnetization of the recording layer 9 can be reversed by the external modulated magnetic field $\pm H_{EX}$ applied from the magnetic head 13.

Figure 5A:
FIGS. 5A to 5D are charts for explaining a recording state by the conventional magnetic field modulation method.
Figure 5B:
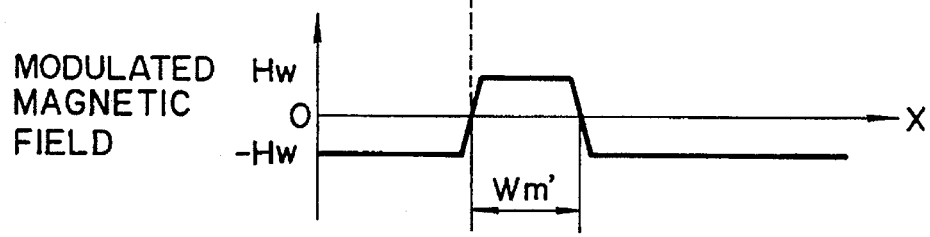
Figure 5C:
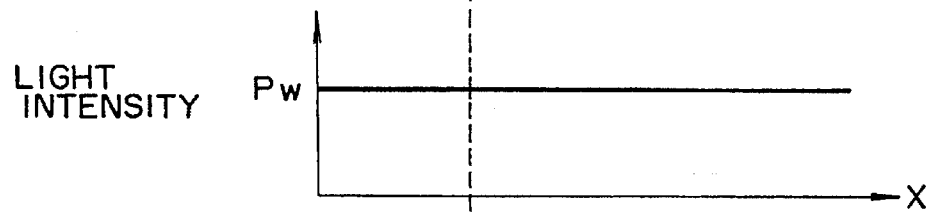
Figure 5D:
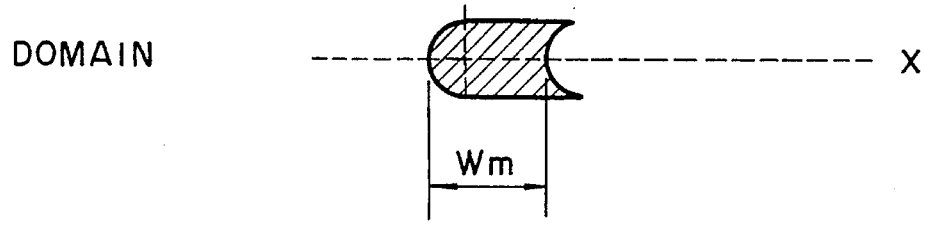
Figure 6:
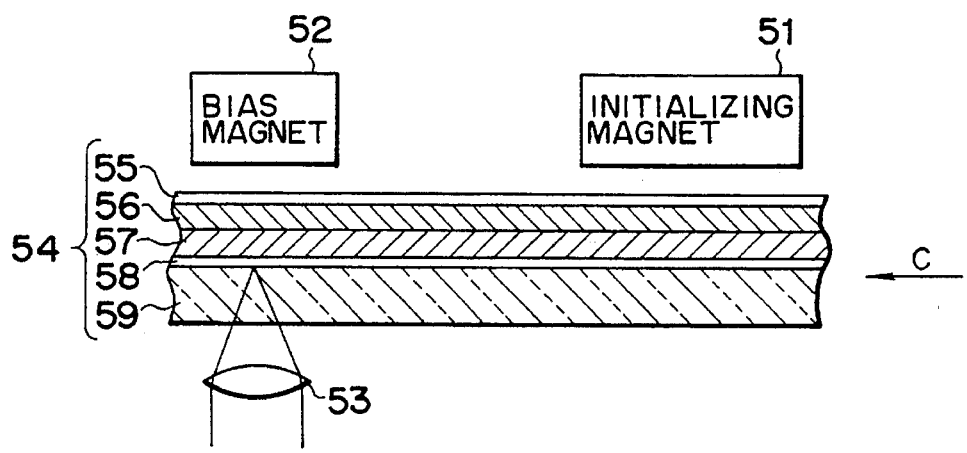
FIG. 6 is a schematic view for explaining the structure of a magnetooptical recording medium and the arrangement of a recording apparatus in a conventional optical modulation method.
Figure 7:
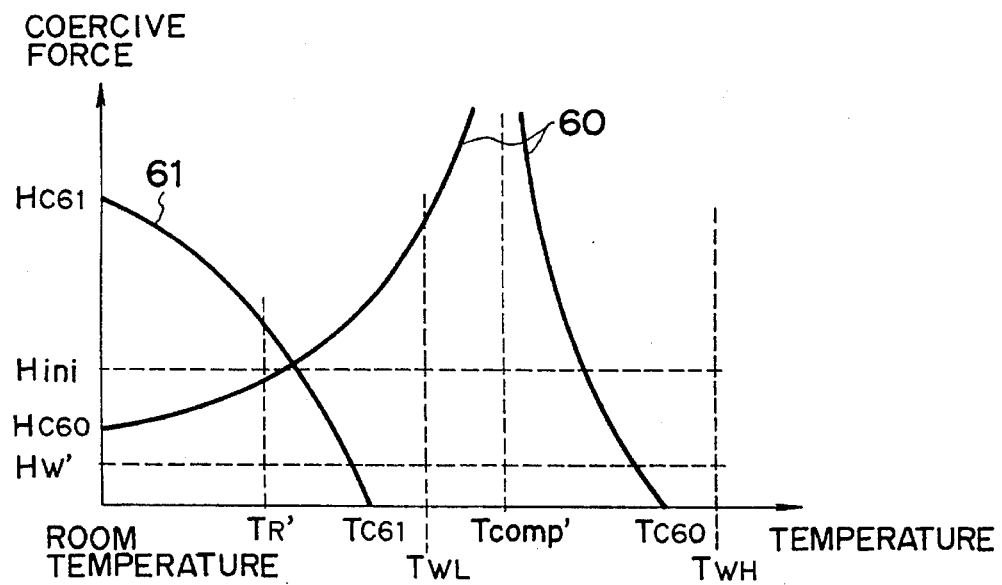
FIG. 7 is a graph showing the characteristics of magnetic layers of the magnetooptical recording medium shown in FIG. 6.
Figure 8A:
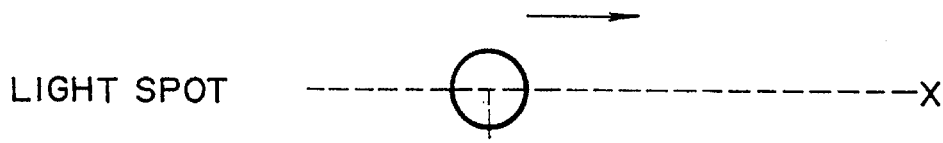
FIGS. 8A to 8D are charts for explaining a recording state by the conventional optical modulation method.
Figure 8B:
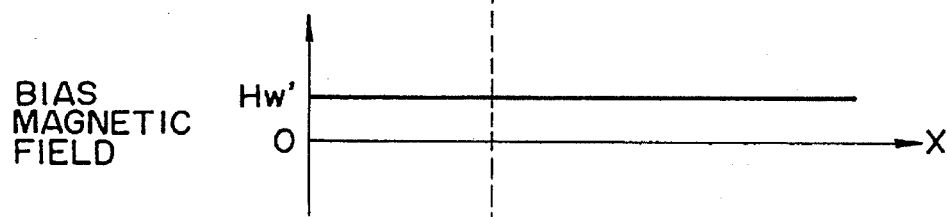
Figure 8C:
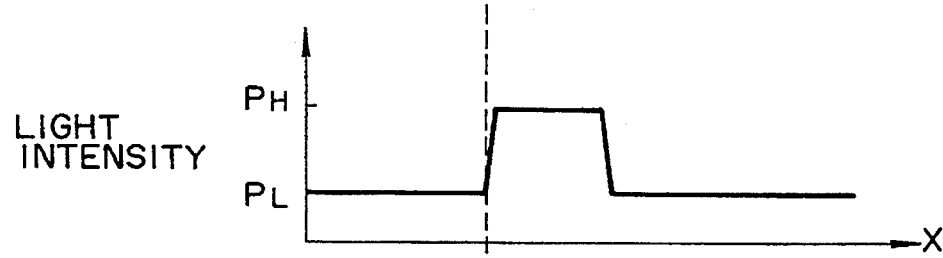
Figure 8D:
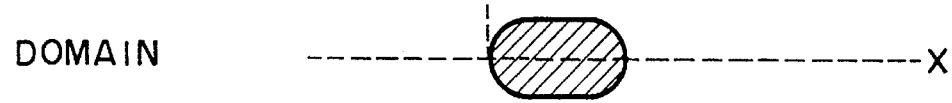

In a state wherein the recording possible region 19 and the exchange coupling force blocking region 20 including the light spot 18 and the recording possible region 19 are formed by scanning the light spot 18 of a predetermined power, the external magnetic field is modulated to $+H_{EX}$ or $-H_{EX}$ by the magnetic head 13 according to recording information, and the modulated magnetic field is applied to a region approximately including the exchange coupling force blocking region 20. As a result, domains of new information are overwritten on the recording possible region of the recording layer 9. The domain has an arrow-headed shape, as shown in FIG. 5D. In FIG. 17A, a domain 21a corresponds to that of previously recorded information, and a domain 21b corresponds to that of newly recorded information. On the other hand, the direction of magnetization of the reproduction layer 7 in the exchange coupling force blocking region 20 is changed in correspondence with the modulated external magnetic field. In other words, the direction of magnetization of the reproduction layer 7 is aligned in the same direction as that of a domain overwritten on the recording layer 9. When light reflected by the magnetooptical recording medium at that time is received by the detection system shown in FIG. 11, the polarization state of reflected light can be detected as the output signal 2. In this method, since the light spot of the predetermined power is radiated, and recording information is known in advance, a polarization state detection signal as the output signal 2 in an ideal recording state is known. For this reason, nonuniformity of magnetooptical characteristics of the magnetooptical recording medium can be detected by checking a difference between this signal and an actually detected signal. On the other hand, a change in reflectance of the magnetooptical recording medium can be detected from the total light amount detection signal as the output signal 4, as described above. Whether a domain is normally recorded, or a domain is not locally recorded but information can be reproduced upon execution of error correction processing, or no domain is recorded and information cannot be reproduced even by the error correction processing can be determined according to the degree of nonuniformity of the magnetooptical characteristics and a difference in reflectance from a predetermined value of the magnetooptical recording medium. When information cannot be reproduced, the information is re-recorded on another portion of the medium. When information can be reproduced upon execution of error correction, the information is re-recorded on another portion of the medium if the frequency of such portions exceeds a predetermined value. When the nonuniformity of the magnetooptical characteristics and a difference in reflectance fall within allowable ranges, it is determined that a domain is normally recorded, and information is sequentially recorded. As described above, whether or not domains are normally recorded can be confirmed by detecting both the nonuniformity of magnetooptical characteristics and the difference in reflectance, thus improving recording precision.

A procedure for executing the above-mentioned direct verifying operation after it is detected that the entire magnetooptical recording medium of the present invention is not influenced by a change in magnetooptical characteristics over time, and that the medium has no possibility of the change for a while, will be described below with reference to FIG. 18.

Figure 18:
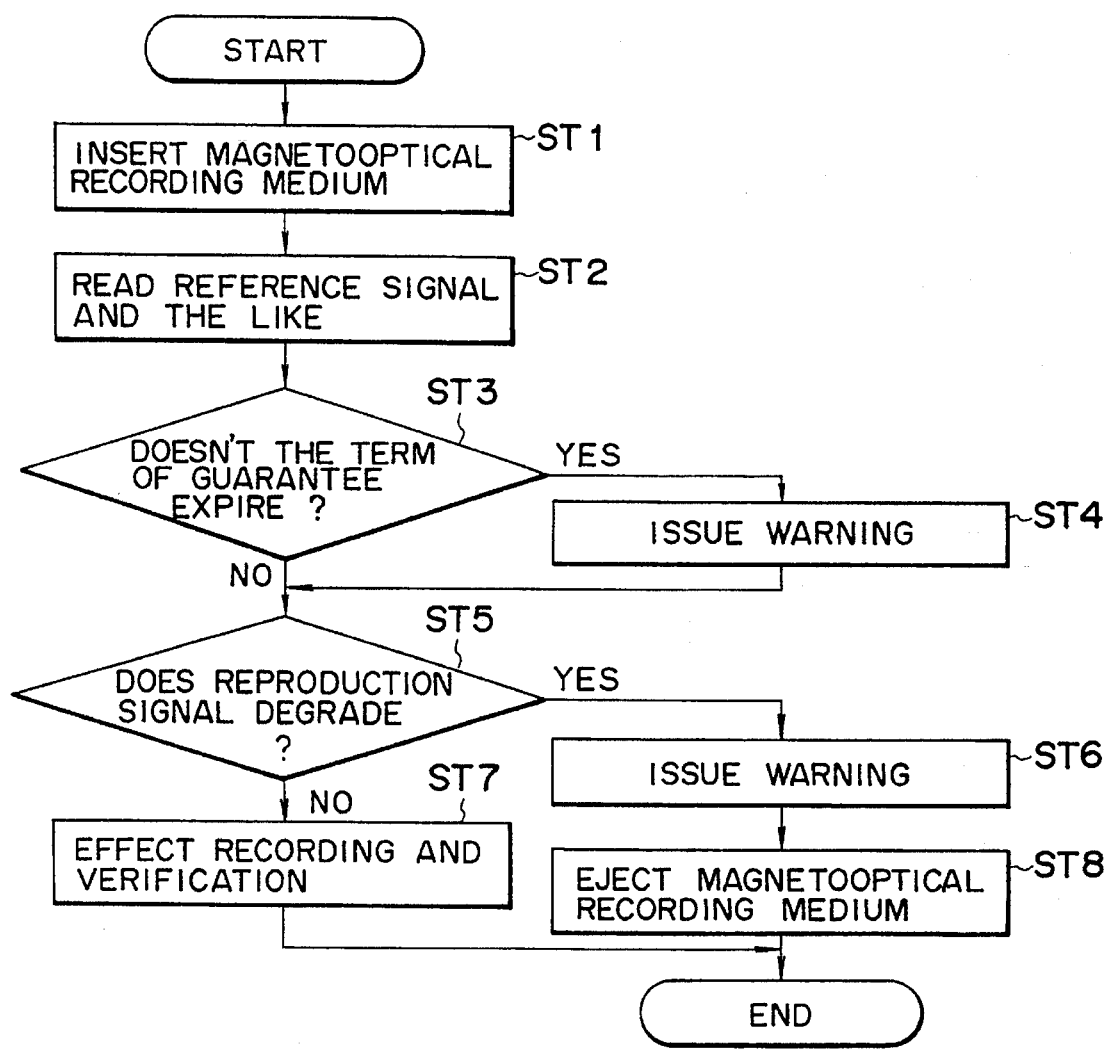
FIG. 18 is a flow chart for explaining processes of a recording determination method of the present invention.

In FIG. 18, a user inserts a magnetooptical recording medium in the magnetooptical recording/reproduction apparatus (ST1). The magnetooptical recording/reproduction apparatus reads a reference signal for checking degradation of magnetooptical characteristics, and information associated with the manufacturing date of the medium, the information preservation guarantee term, and the like, which are stored at a predetermined position on the magnetooptical recording medium (ST2).

The apparatus presents the read information associated with the manufacturing date, the information preservation guarantee term, and the like, to the user, and checks if the term of the guarantee has not expired (ST3). If YES in step ST3, the apparatus issues a warning message indicating that information recording/reproduction operations may cause errors, recorded information must be backed up, and so on (ST4). When the term of the guarantee is expected to expire soon, a similar warning message may be issued.

If it is determined in step ST3 that the term of the guarantee has not expired, the apparatus checks based on a reproduction signal of the read reference signal if the magnetooptical characteristics are degraded (ST5). As the reference signal, a signal having a predetermined period, a predetermined random signal, a signal which easily causes a reproduction error when the characteristics are degraded, or the like has been recorded in advance. As a method of checking whether or not the characteristics are degraded, a method of checking the amplitude of the read reproduction signal, and comparing it with an initial value, and a method of recording the reference signal together with an error correction code having a lower error correction capacity than normal information, and checking whether or not an error occurs in reproduction, are available. When degradation of the magnetooptical characteristics exceeds a predetermined level, the apparatus issues, to the user, a warning message indicating that a possibility of erroneous information recording/reproduction operations is high, information can or cannot be backed up, and so on (ST6). The magnetooptical recording medium is automatically ejected (ST8), thus ending the operation.

If it is determined in step ST5 that the magnetooptical characteristics are not degraded, the recording operation and the above-mentioned direct verifying operation are performed (ST7). Upon completion of all the recording and verifying operations, the magnetooptical recording medium is automatically ejected (ST8), thus ending the operation.

When information recording is performed on the magnetooptical recording medium for which the warning was issued in step ST6 regardless of the warning, or when reproduction for backing up recorded information is performed on such a medium, the warning is issued in step ST6 when the identical magnetooptical recording medium is inserted twice successively, and thereafter, the flow may advance to step ST7 to execute recording or reproduction. In addition, information such as the warning content in step ST4 or ST6, the manufacturing number of the magnetooptical recording medium for which the warning was issued, the warning date, and the like may be recorded on the magnetooptical recording medium or in the magnetooptical recording/reproduction apparatus.

In the above embodiment, defects of the medium are detected. However, whether or not recording is normally performed can be more precisely determined by detecting errors of an information signal and a synchronous signal. Such an embodiment will be described below.

Figure 19:
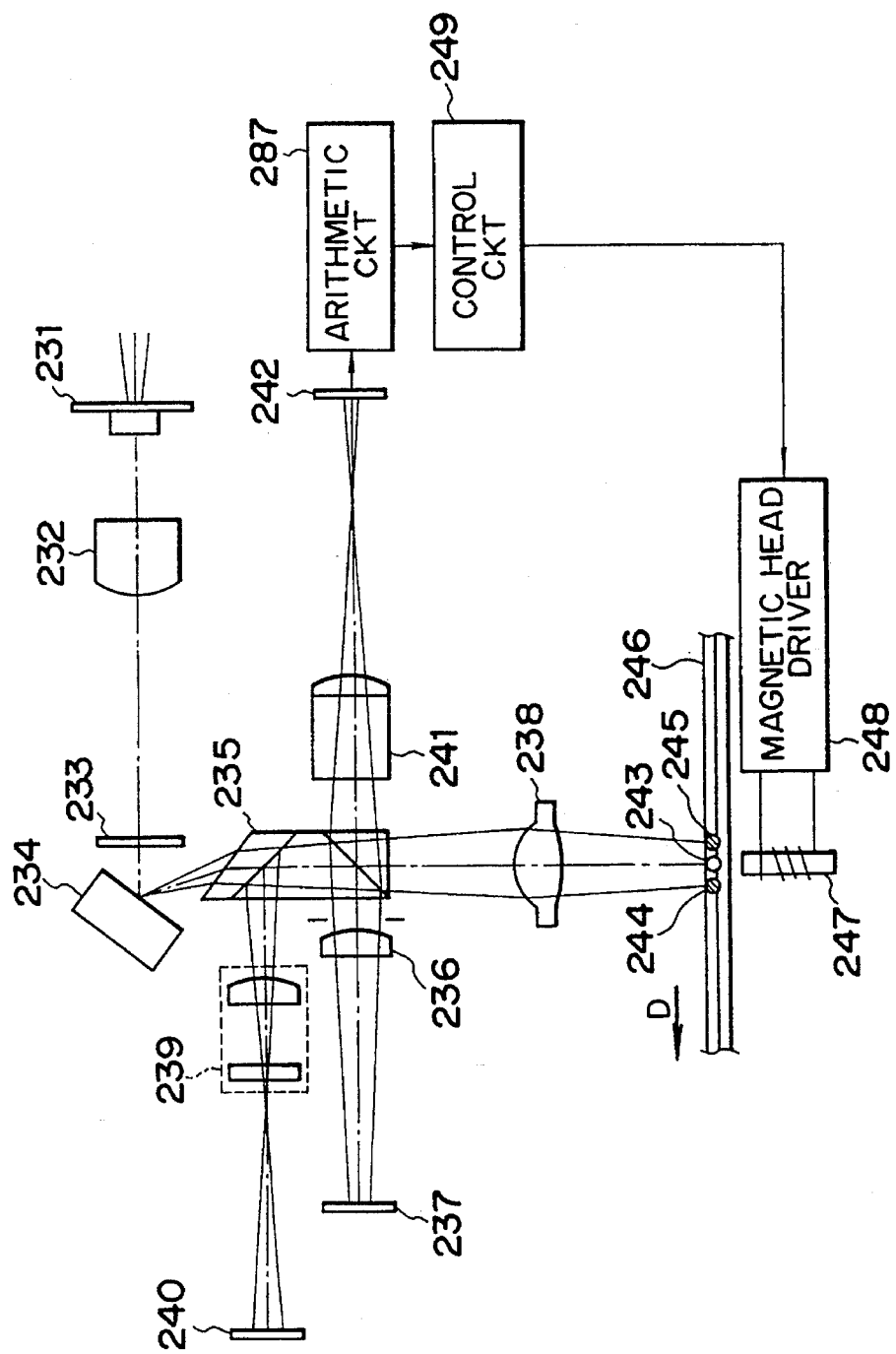
FIG. 19 is a schematic diagram showing a data recording apparatus according to the third embodiment of the present invention.

FIG. 19 is a schematic diagram showing an arrangement of the third embodiment wherein the present invention is applied to a magnetooptical disk apparatus. In FIG. 19, a magnetooptical disk 246 as a recording medium is rotated by a motor (not shown), and is moved in a direction of an arrow D. An optical head and a magnetic head 247 are arranged at almost opposite positions to sandwich the disk 246 therebetween. The optical head incorporates a semiconductor laser 231 as a light source, a collimator lens 232, a diffraction grating 233, an optical path deflection mirror 234, a beam splitter 235, an objective lens 238, an automatic laser power control sensor 237, a servo sensor 240, a Wollaston prism 241, an RF signal detection sensor 242, and the like. Focusing lenses 236 and 239 respectively form optimum images on the sensors 237 and 240.

Figure 20:
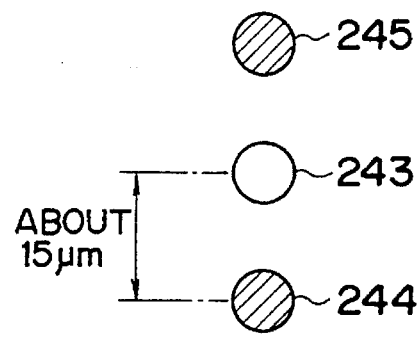
FIG. 20 is a schematic view showing a state of a beam spot on a disk in the apparatus shown in FIG. 19.

In the above-mentioned apparatus, a light beam emitted from the semiconductor laser 231 is split by the diffraction grating 233 into three light beams corresponding to a 0th-order diffracted light component and ±1st-order diffracted light components. The split light beams are focused by the objective lens 238, and respectively form three beam spots 243, 244, and 245 on the disk 246. These beam spots are aligned in the longitudinal direction of a track formed on the disk, i.e., in the scanning direction of the light beam. FIG. 20 shows an arrangement of these beam spots on the disk. The distance between the spots 243 and 244 is about 15 μm. The diffraction grating 233 is formed so that the ratio of the light intensity of the spot 243 to the light intensity of the spots 244 and 245 is 5:1. Of these spots, the spot 243 is used in recording and normal reproduction, and the spot 244 is used in verification. The spot 245 is not used.

As can be understood from the moving direction D of the disk shown in FIG. 19, the beam spot 243 is a leading spot, and the beam spot 244 is a trailing spot in the scanning direction of the light beam. When data is recorded, the data is recorded on the disk 246 by the leading spot 243, and the recorded data is read out by the trailing spot 244 to perform verification. Since the spots 243 and 244 are separated by about 15 μm, as described above, the recording signal and the readout signal have a time difference therebetween corresponding to the time required for moving the spot across this distance.

The verifying operation in this apparatus will be described below. Data recording using the beam spot 243 is performed in the same manner as in the prior art described above. The recorded data is scanned by the trailing beam spot 244. Reflected light of the beam spot 244 is transmitted through the objective lens 238 again, and is split by the beam splitter 235 from the optical path of the light beam radiated onto the disk 246. The split reflected light is detected by the RF signal detection sensor 242 via the Wollaston prism 241. The output signal from the sensor 242 is subjected to a predetermined arithmetic operation in an arithmetic circuit 287 so as to extract a reproduction signal (RF signal) $S_{RF}$.

Figure 21:
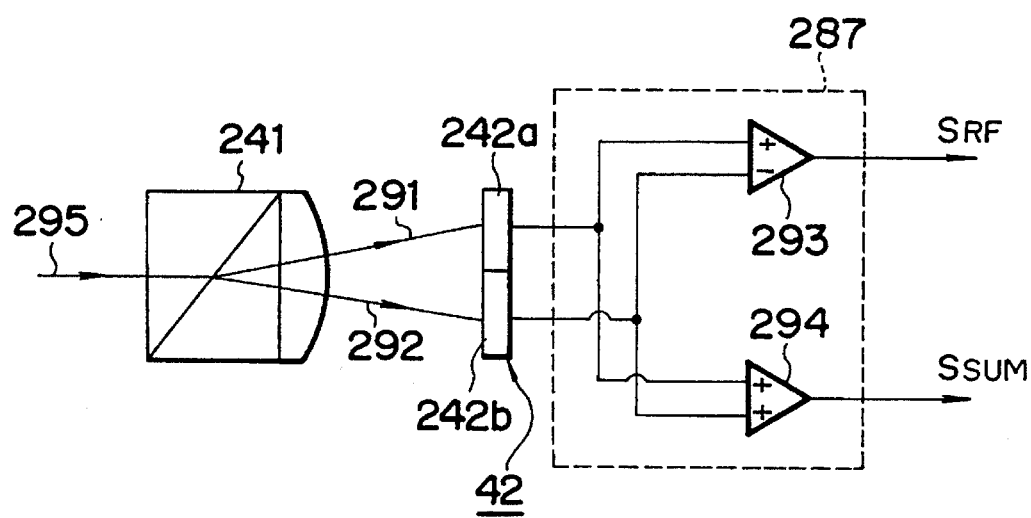
FIG. 21 is a schematic diagram for explaining a detection system in the apparatus shown in FIG. 19 in more detail.

FIG. 21 is a diagram for explaining the detection system between the Wollaston prism 241 and the arithmetic circuit 287 in more detail. FIG. 21 illustrates only reflected light 295 of the beam spot 244. The reflected light 295 is split by the Wollaston prism 241 into two light beams 291 and 292 having orthogonal directions of polarization. The crystallographic axis of the Wollaston prism 241 is arranged to form an angle of 45° with the direction of polarization of light before modulation in the direction of polarization, i.e., the direction of polarization of the light beam incident on the disk. For this reason, the light beams split by the Wollaston prism 241 are converted into those which are intensity-modulated according to information recorded on the disk, and the signal components of the light beams 291 and 292 have a 180° phase difference therebetween.

The light-receiving surface of the sensor 242 is split into two surfaces 242a and 242b, and the above-mentioned modulated light beams 291 and 292 respectively become incident on the light-receiving surfaces 242a and 242b. The output signals from these light-receiving surfaces are input to the arithmetic circuit 287. The arithmetic circuit 287 is constituted by a differential amplifier 293 and an adder 294. The differential amplifier 293 outputs a difference between the output signals from the light-receiving surfaces 242a and 242b. Since the signal components of the modulated light beams 291 and 292 have a 180° phase difference therebetween, as described above, reflected light intensity variation components caused by a change in reflectance of the disk cancel each other, and the differential amplifier 293 outputs the RF signal $S_{RF}$. On the other hand, the adder 294 adds the output signals from the light-receiving surfaces 242a and 242b. Therefore, signal components according to information on the disk cancel each other, and the adder outputs a sum signal $S_{SUM}$ according to the reflectance of the disk.

Figure 22:
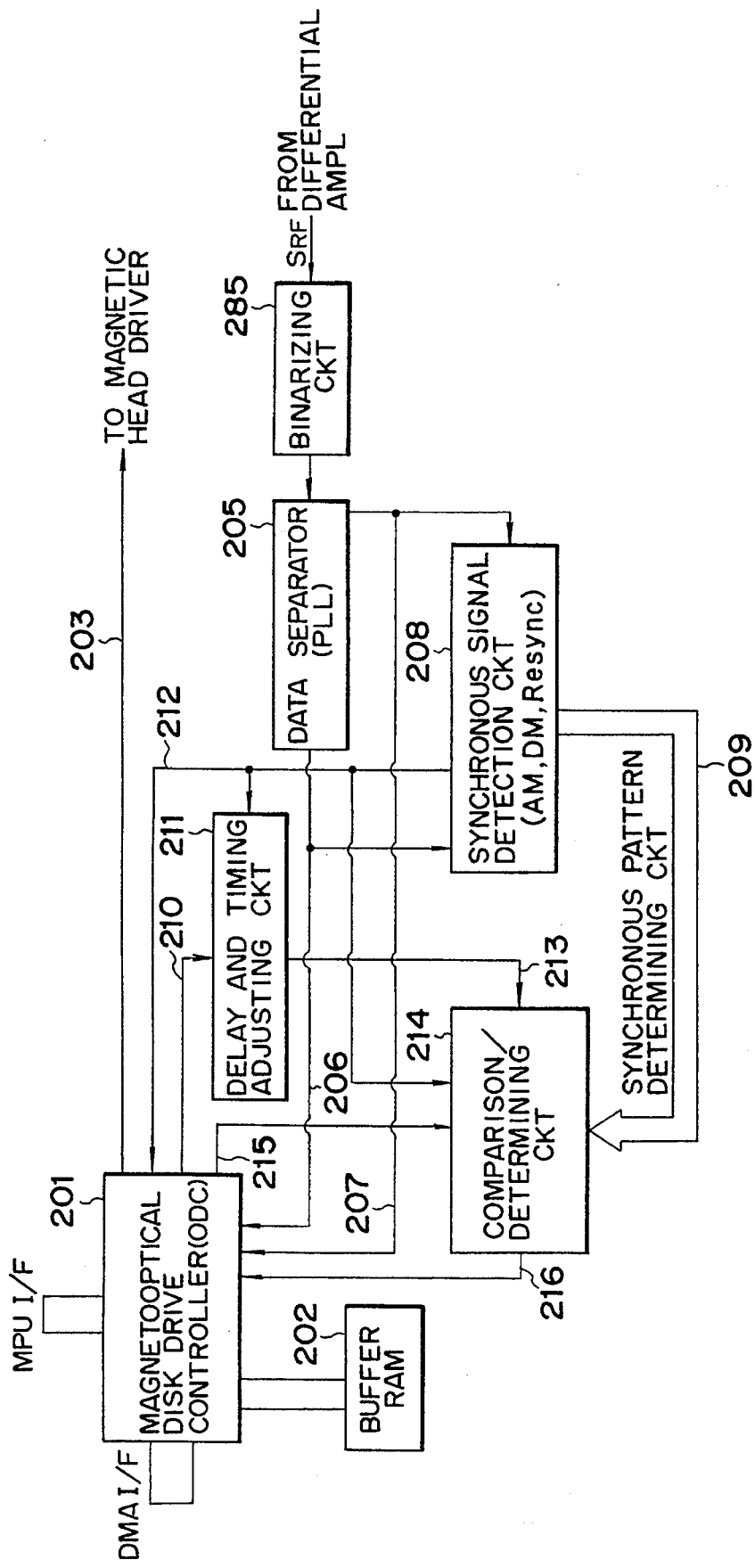
FIG. 22 is a block diagram showing an arrangement of a control circuit in the apparatus shown in FIG. 19.

The signals output from the arithmetic circuit 287 are input to a control circuit 249, and verification is performed. FIG. 22 is a block diagram showing an arrangement of the control circuit 249. In FIG. 22, a magnetooptical disk drive controller (ODC) 201 has the same arrangement as that in FIG. 10, except for a synchronous signal detection section. The ODC 201 is connected to a buffer RAM 202 for temporarily storing data. When data is to be recorded, after the address of a sector to be subjected to recording on the disk is confirmed, data is read out from the buffer RAM 202 in synchronism with a synchronous signal 212 detected from light reflected by the disk, and is added with an error correction code by an ECC circuit in the ODC 201. The data added with the error correction code is modulated (1–7 modulation in this embodiment) by a modulation circuit to a signal format to be recorded on the disk, and the modulated data is supplied to a magnetic head driver 248. The magnetic head driver 248 drives the magnetic head 247 according to the input recording signal, thereby recording data on the magnetooptical disk 246.

The RF signal $S_{RF}$ sent from the above-mentioned differential amplifier 293 is converted into a digital signal by a binarizing circuit 285, and the digital signal is input to a data separator 205. The data separator 205 generates clocks (VCO clocks) synchronous with the input signal, and supplies the clocks to a synchronous detection circuit 208 and a demodulation circuit in the ODC 201 together with reproduction data. The demodulation circuit converts the signal modulated in recording to an original NZR (non-return to zero) signal, removes synchronous data marks, resync marks, and the like from the converted signal, and supplies the converted signal to a comparison/determining circuit 214 as reproduction data 215.

A synchronous signal detection circuit 208 detects an address mark recorded in a preformat portion, and data marks and resync marks recorded in a data portion, and supplies them to the ODC 201 and a delay and timing adjusting circuit 211. A pattern of each data mark consists of 24 bits, and even when some of all patterns are partially lost due to defects of the disk, the data marks can be reproduced. When the data mark is detected, a data mark detection section detects quality of the data mark, i.e., detects the number of bits coinciding with the original 24 bits, and compares the number of detected hits with a predetermined reference value. When the number of coinciding hits does not reach the reference value, a synchronous pattern determining signal 209 indicating a recording error is supplied to the comparison/determining circuit 214.

Each resync mark consists of 16 bits, and is detected when the entire pattern coincides with an original pattern. 39 resync marks are present at every 15 bytes in one sector. Pattern comparison is made in a detection window generated with reference to the data mark. When a resync mark is not detected in the detection window, an interpolation pulse is inserted, and an error signal indicating that no mark is detected in the window is generated. Even when a resync mark is detected in the window, if it is not detected at the expected position, an error signal is also generated. The error signal is input to a counter, which is reset in units of sectors, and the number of errors per sector is counted. When the count value exceeds a predetermined reference value, the sector is determined as a defective sector, and the synchronous pattern determining signal 209 indicating a defective sector is supplied to the comparison/determining circuit 214.

Reproduction data input to the ODC 201 is supplied to the comparison/determining circuit 214 together with recording data, and upon comparison of these data, errors are detected. At this time, recording data 210 is input to the delay and timing adjusting circuit 211, and is delayed with reference to a reproduced synchronous signal. The delayed signal is input to the comparison/determining circuit 214 as a signal 213 synchronous with the reproduction data 215.

Figure 23:
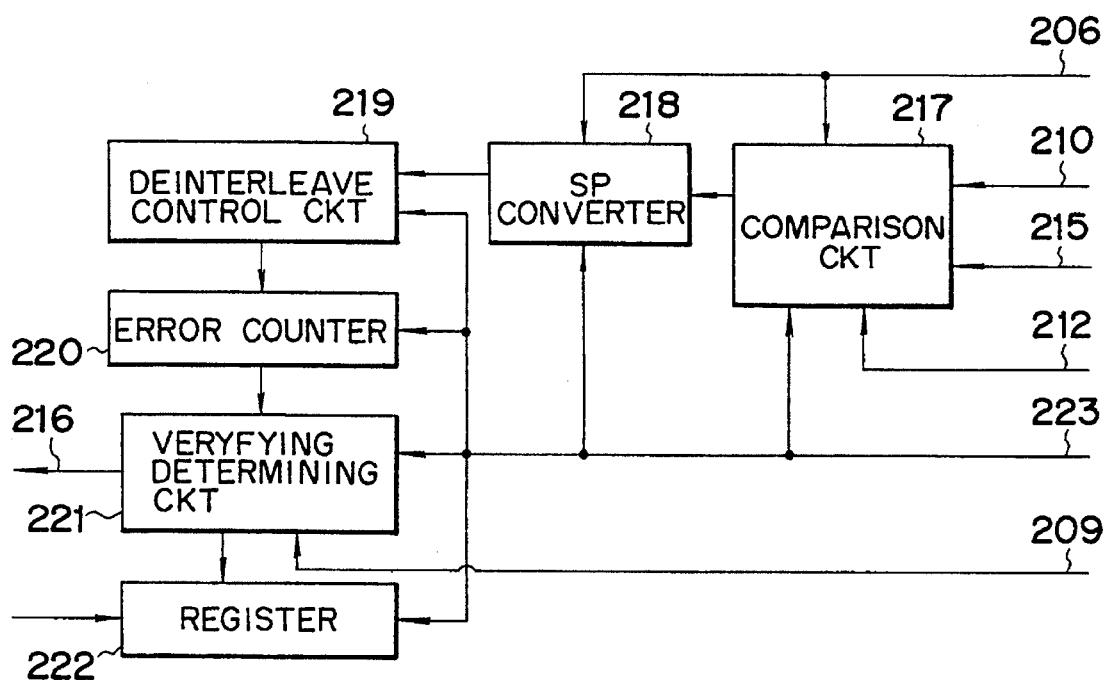
FIG. 23 is a block diagram showing an arrangement of a comparison/determining circuit in the circuit shown in FIG. 22.
Figure 24:
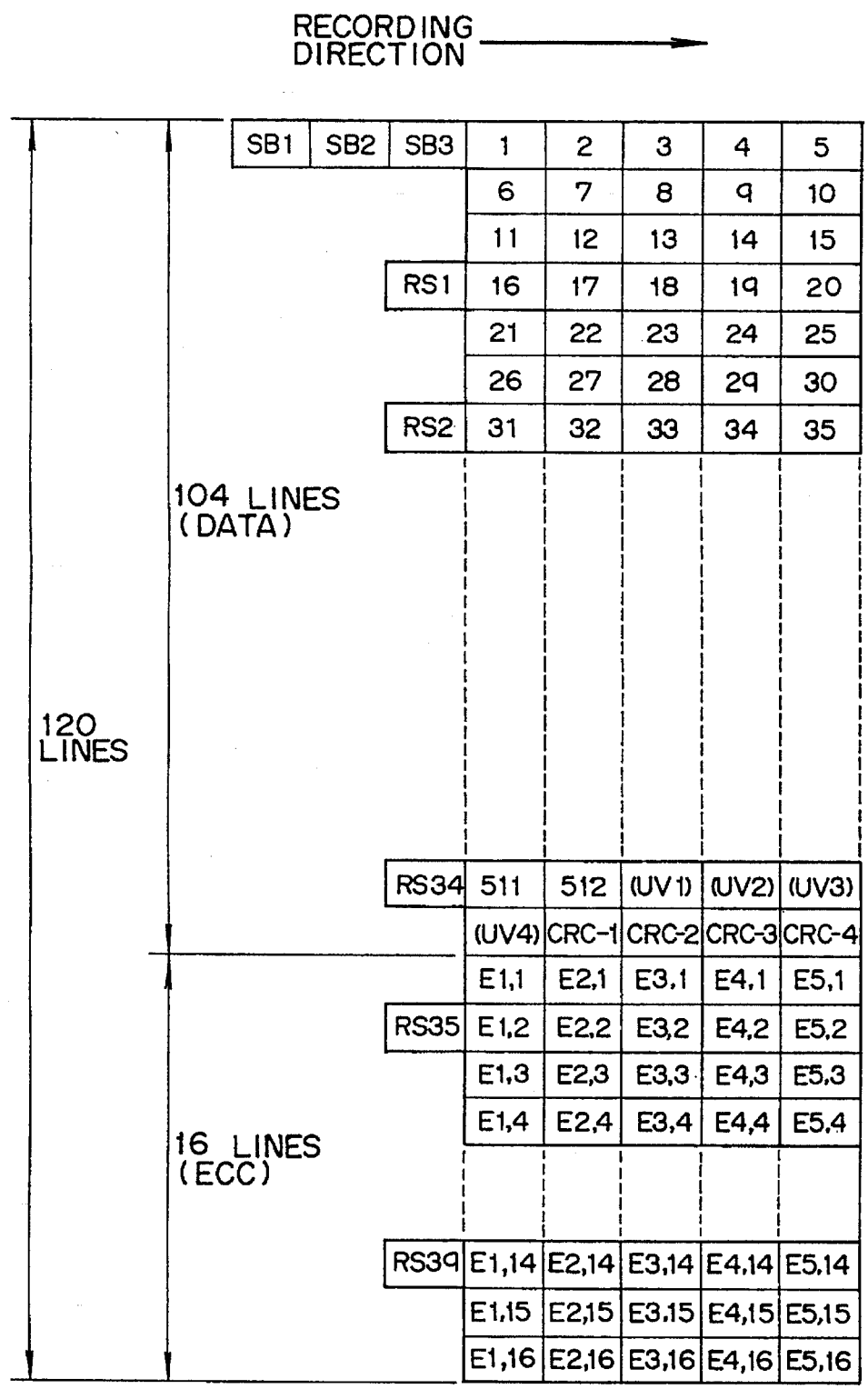
FIG. 24 is a view for explaining the sector format of data determined in the third embodiment.

Error detection and determination of a recording state in the comparison/determining circuit will be described below. FIG. 23 is a block diagram showing an arrangement of the comparison/determining circuit 214 shown in FIG. 22. In FIG. 23, the comparison/determining circuit comprises a comparison circuit 217, a serial-to-parallel (SP) converter 218, a deinterleave control circuit 219, an error counter 220, a verifying determining circuit 221, and a register 222. In this embodiment, data having the sector format, as shown in FIG. 24, is recorded. The sector means a recording unit of data. For example, in the case of a disk-like recording medium, a plurality of tracks are spirally formed on a recording surface, and each track is divided into a plurality of sectors in the circumferential direction. FIG. 24 exemplifies an ISO format data portion of a 3.5" magnetooptical disk.

In FIG. 24, data consists of data marks SB1, SB2, and SB3, resync codes RS1, RS2, ..., RS39, data 1, 2, ..., 512, vender unique data UV1, ..., UV4, cyclic codes CRC-1, ..., CRC-4 as error check codes, and error correction parity codes E1.1, E2.1, ..., E5.16. The data shown in FIG. 24 is constituted by the following five interleaves except for the data marks and the resync codes.

Interleave 1: 1, 6, 11, 16, ..., 511, (UV4), E1.1, E1.2, ..., E1.16

Interleave 2: 2, 7, 12, 17, ..., 512, CRC-1, E2.1, E2.2, ..., E2.16

Interleave 3: 3, 8, 13, 18, ..., 508, (UV1), CRC-2, E3.1, E3.2, ..., E3.16

Interleave 4: 4, 9, 14, 19, ..., 509, (UV2), CRC-3, E4.1, E4.2, ..., E4.16

Interleave 5: 5, 10, 15, 20, ..., 510, (UV3), CRC-4, E5.1, E5.2, ..., E5.16

Each interleave consists of 120 bytes, and has a capacity capable of correcting errors up to 8 bytes using 16-byte ECC parity codes.

In the circuit shown in FIG. 23, the recording data 213 is sent from the ODC 201 shown in FIG. 22, is synchronized with the reproduction data by the delay and timing adjusting circuit 211 (e.g., a FIFO), and is then input to the comparison circuit 217. On the other hand, the reproduction data 215 is subjected to synchronization processing and demodulation processing, as described above, so as to have the same bit arrangement as that of the recording data, and is then input from the ODC 201 to the comparison circuit 217. The comparison circuit 217 compares the recording data 213 with the reproduction data 215 in units of bits. In this case, a bit for which an error is detected is set to be "1". Subsequently, the SP converter 218 converts the bit flow of the comparison result output from the comparison circuit 217 from serial data to parallel data. The parallel data is generated in units of bytes (8 bits). The deinterleave control circuit 219 achieves data synchronization of the data comparison result and the disk defect detection result in units of interleaves.

The error counter 220 counts the number of errors detected upon data comparison on the basis of the output from the deinterleave control circuit 219. The error counter 220 is designed to count two values, i.e., the number of errors in each interleave, and the total number of errors generated in all of the interleaves in one sector. The register 222 is set in advance with a reference value of the number of errors, which value is used for determining whether recording is normally performed or causes a verifying error upon comparison with the number of detected errors. In the register 222, two reference values, i.e., an allowable value of the number of errors in each interleave, and an allowable value of the total number of errors generated in all of the interleaves in one sector are set in correspondence with the error counter.

The verifying determining circuit 221 compares the count values of the error counter 220 with the corresponding reference values stored in the register 222 to determine a recording state. The circuit 221 supplies a determining signal 216 to the ODC 201 together with the determination result of the synchronous signal. The determination criteria of the verifying determining circuit 221 are as follows.

1) If an interleave in which three or more errors occur is detected, the corresponding sector is determined as an NG sector.

2) If the total number of errors detected in all of the interleaves (the number of errors in one sector) is 15 or more, the corresponding sector is determined as an NH sector.

The reference values are not limited to 3 and 15, but may be desirably set, as a matter of course. In addition, determination may be made using only the condition 1) or 2).

Figure 25:
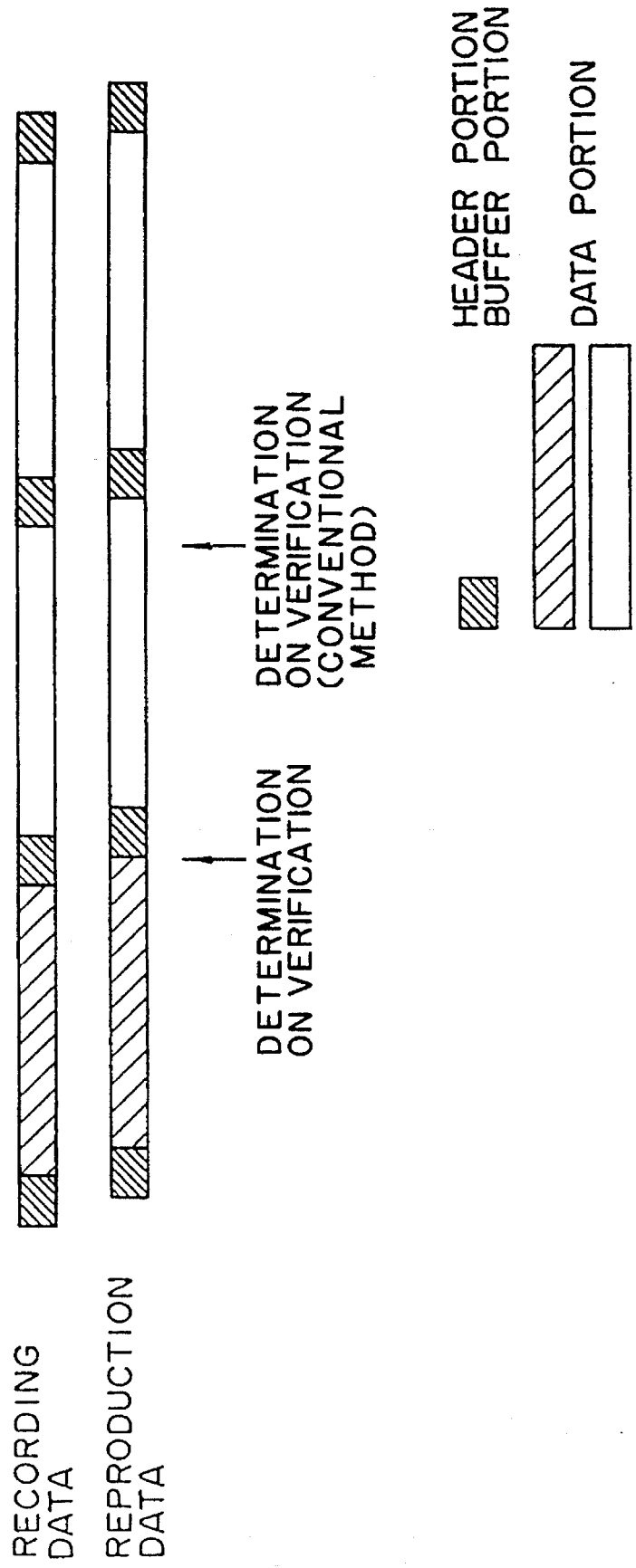
FIG. 25 is a view for explaining a difference in verifying determination timing between the present invention and the conventional method.

In this embodiment, since error detection is performed without using an ECC circuit, determination can be performed immediately after sector data are read, as shown in FIG. 25. Therefore, the direct verifying operation can be performed in almost real time.

In this embodiment, a recording state is determined based on the detection result of data errors and the detection level of the synchronous signal. When defects of the medium are detected, and a recording state is determined in consideration of the number of detected defects, determination can be more precisely made. Such an embodiment will be described below.

Figure 26:
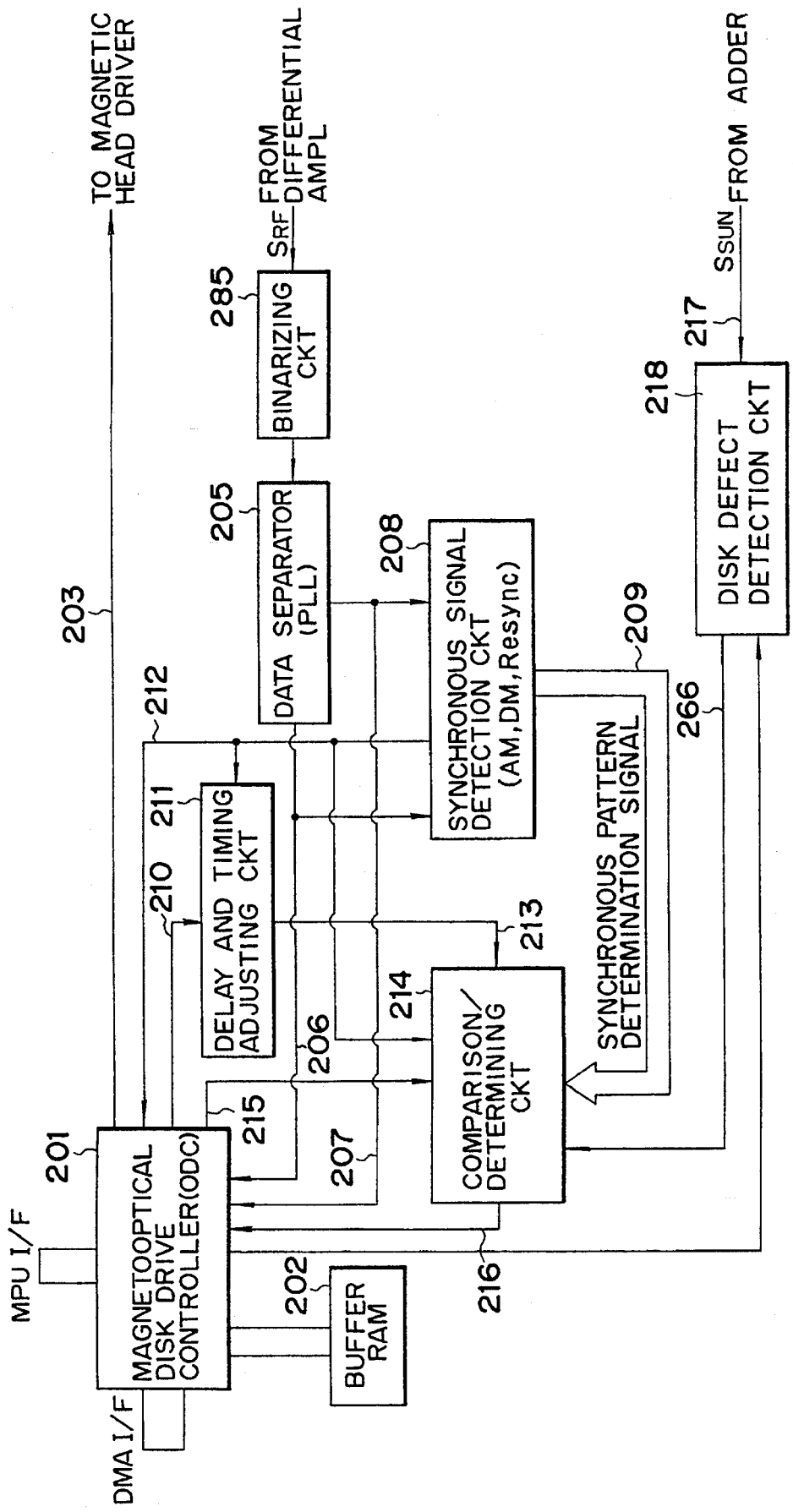
FIG. 26 is a block diagram showing a control circuit of a data recording apparatus according to the fourth embodiment of the present invention.

FIG. 26 is a block diagram showing a control circuit 249 according to the fourth embodiment of the present invention. This embodiment has substantially the same circuit arrangement as that in the third embodiment shown in FIGS. 19 to 21, except for the control circuit. The same reference numerals in FIG. 26 denote the same parts as in FIG. 22.

Figure 10:
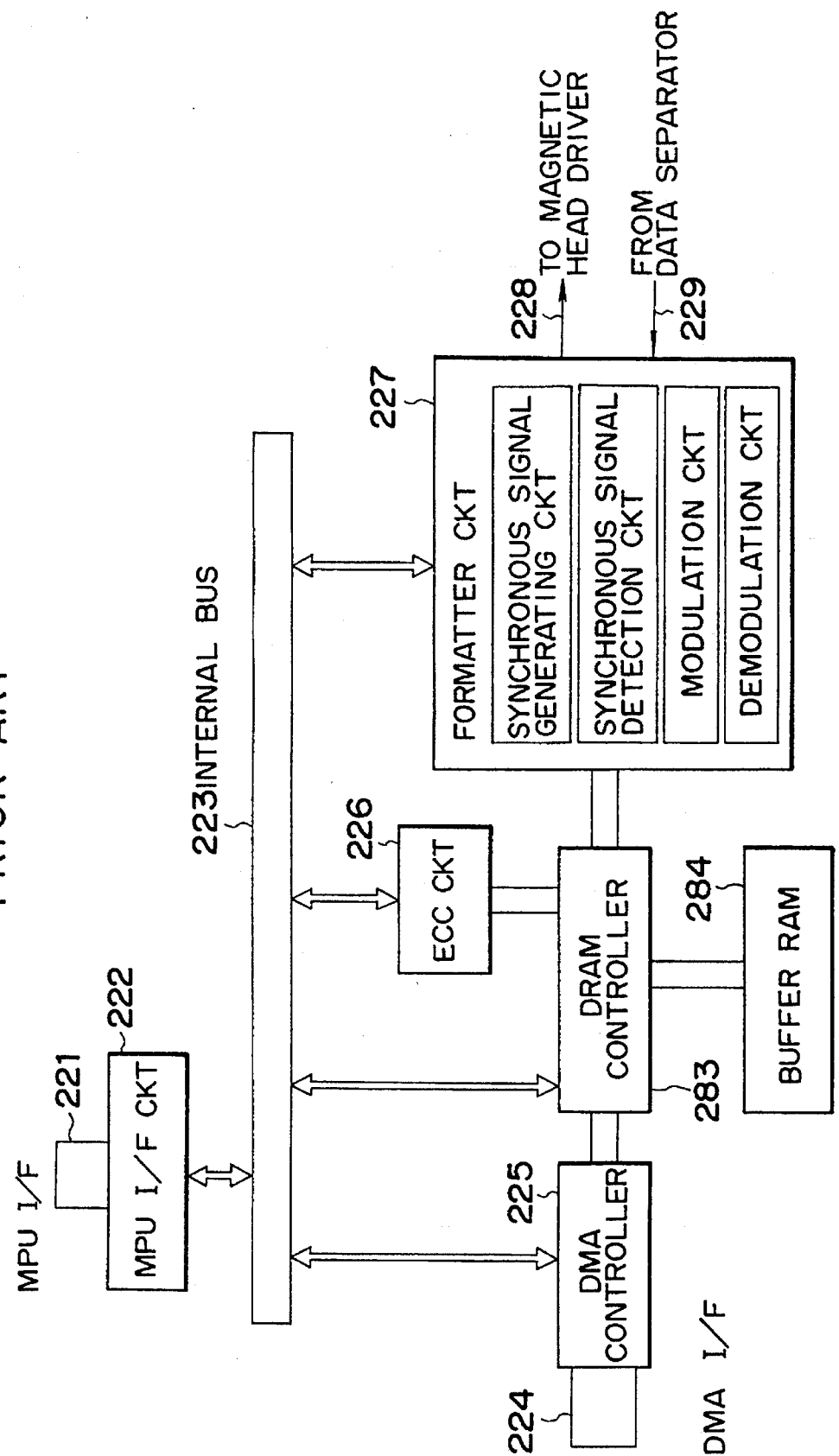
FIG. 10 is a block diagram showing an arrangement of a magnetooptical disk drive controller in the apparatus shown in FIG. 9.

In FIG. 26, a magnetooptical disk drive controller (ODC) 201 has substantially the same construction as that shown in FIG. 10, except for a synchronous signal detection section. The ODC 201 is connected to a buffer RAM 202 for temporarily storing data. When data is to be recorded, after the address of a sector to be subjected to recording on the disk is confirmed, data is read out from the buffer RAM 202 in synchronism with a synchronous signal 212 detected from light reflected by the disk, and is added with an error correction code by an ECC circuit in the ODC 201. The data added with the error correction code is modulated (1–7 modulation in this embodiment) by a modulation circuit to a signal format to be recorded on the disk, and the modulated data is supplied to the magnetic head driver 248. The magnetic head driver 248 drives the magnetic head 247 according to the input recording signal, thereby recording data on the magnetooptical disk 246.

The RF signal $S_{RF}$ sent from the above-mentioned differential amplifier 293 is converted into a digital signal by a binarizing circuit 285, and the digital signal is input to a data separator 205. The data separator 205 generates clocks (VCO clocks) synchronous with the input signal, and supplies the clocks to a synchronous detection circuit 208 and a demodulation circuit in the ODC 201 together with reproduction data. The demodulation circuit converts the signal modulated in recording to an original NZR (non-return to zero) signal, removes synchronous data marks, resync marks, and the like from the converted signal, and supplies the converted signal to a comparison/determining circuit 214 as reproduction data 215.

A synchronous signal detection circuit 208 detects an address mark recorded in a preformat portion, and data marks and resync marks recorded in a data portion, and supplies them to the ODC 201 and a delay and timing adjusting circuit 211. A pattern of each data mark consists of 24 bits, and even when some of all patterns are partially lost due to defects of the disk, the data marks can be reproduced. When the data mark is detected, a data mark detection section detects quality of the data mark, i.e., detects the number of bits coinciding with the original 24 bits, and compares the number of detected bits with a predetermined reference value. When the number of coinciding bits does not reach the reference value, a synchronous pattern determining signal 209 indicating a recording error is supplied to the comparison/determining circuit 214.

Each resync mark consists of 16 bits, and is detected when the entire pattern coincides with an original pattern. 39 resync marks are present at every 15 bytes in one sector. Pattern comparison is made in a detection window generated with reference to the data mark. When a resync mark is not detected in the detection window, an interpolation pulse is inserted, and an error signal indicating that no mark is detected in the window is generated. Even when a resync mark is detected in the window, if it is not detected at the expected position, an error signal is also generated. The error signal is input to a counter, which is reset in units of sectors, and the number of errors per sector is counted. When the count value exceeds a predetermined reference value, the sector is determined as a defective sector, and the synchronous pattern determining signal 209 indicating a defective sector is supplied to the comparison/determining circuit 214.

Reproduction data input to the ODC 201 is supplied to the comparison/determining circuit 214 together with recording data, and upon comparison of these data, errors are detected. At this time, recording data 210 is input to the delay and timing adjusting circuit 211, and is delayed with reference to a reproduced synchronous signal. The delayed signal is input to the comparison/determining circuit 214 as a signal 213 synchronous with the reproduction data 215.

On the other hand, the sum signal $S_{SUM}$ output from the adder 294 shown in FIG. 21 is input to a disk defect detection circuit 218 so as to detect defects of the disk. FIG. 27 is a block diagram showing a construction of the disk defect detection circuit. In FIG. 27, the disk defect detection circuit includes a differentiator 261, and a voltage comparator 262 for comparing the output from the differentiator with a disk defect detection reference level set by a voltage source 263. An AND gate 264 removes signals in the preformat portion, and supplies a disk defect detection signal 266 to the comparison/determining circuit 214.

The operation of the disk defect detection circuit will be described below. FIGS. 28A to 28F show signal waveforms in the respective sections of the disk defect detection circuit. The sum signal $S_{SUM}$ output from the RS signal detection sensor normally has a signal waveform 250 including a DC drift, as shown in FIG. 28A. FIG. 28B shows a signal waveform 251 obtained by expanding the signal 250 along the time base. When a defect is present on the disk, the reflectance of the defect portion may become larger or smaller than that of a normal portion of the medium. Therefore, when a beam spot scans on this defect, waveform components 252 appear on the signal 251 shown in FIG. 28B. The DC components are removed from the signal 251 via the differentiator 261, and the signal 251 is converted to a signal 253 shown in FIG. 28C, so that either an increase or decrease in reflectance can be detected. The signal 253 is input to the comparator 262 to output a signal 256 shown in FIG. 28E.

A signal 254 shown in FIG. 29A illustrates the defect portion of the signal 251 in an enlarged scale. The signal 254 is converted into a signal 258 shown in FIG. 29B by the differentiator 261. When the threshold value of the comparator, i.e., the above-mentioned disk defect detection reference level is set, as denoted by reference numeral 259, a pulse signal 260 shown in FIG. 29C is output in correspondence with the defect portion.

The output signal 256 from the comparator 262 is input to the AND gate 264. The AND gate 264 also receives a signal 255, which is set at low level in correspondence with a preformat portion, and is set at high level in correspondence with a data portion, as shown in FIG. 28D. The AND gate 264 logically ANDs the signals 256 and 255 to remove the influence of a light intensity drift of the preformat portion. Therefore, an output signal 257 from the AND gate 264 becomes a defect detection signal having only high-level pulses corresponding to defect portions on the disk.

Figure 30:
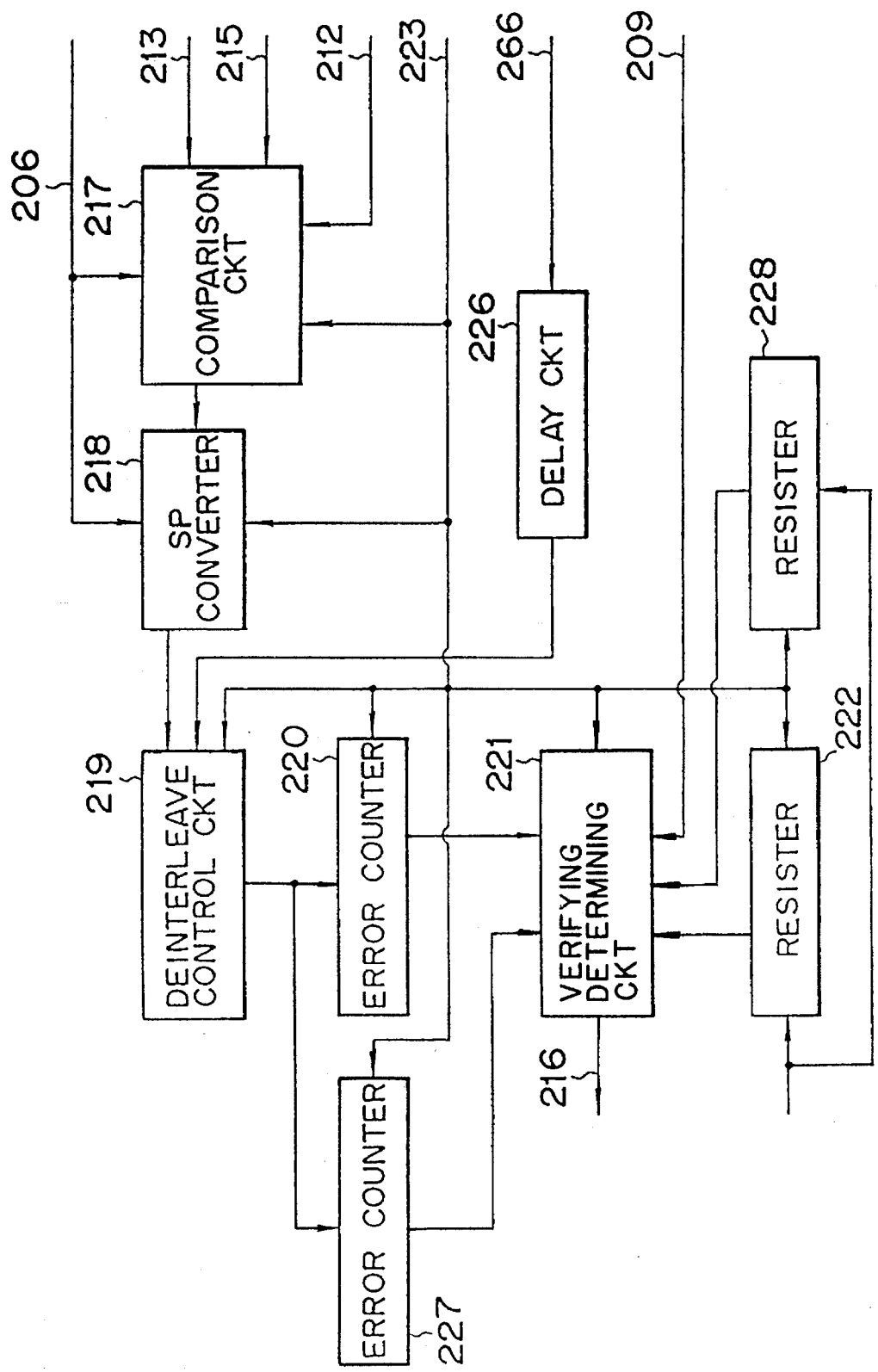
FIG. 30 is a block diagram showing an arrangement of a comparison/determining circuit in the circuit shown in FIG. 26.

Error detection and determination of a recording state in the comparison/determining circuit of the fourth embodiment will be described below. FIG. 30 is a block diagram showing an arrangement of the comparison/determining circuit 214 shown in FIG. 26. The same reference numerals in FIG. 30 denote the same parts as in FIG. 23. In FIG. 30, the comparison/determining circuit 214 comprises a comparison circuit 217, an SP converter 218, a deinterleave control circuit 219, error counters 220 and 227, a verifying determining circuit 221, registers 222 and 228, and a delay circuit 226. In this embodiment, data having the sector format shown in FIG. 24 is recorded like in the above embodiment.

In the circuit shown in FIG. 30, the recording data 213 is sent from the ODC 201 shown in FIG. 26, is synchronized with the reproduction data by the delay and timing adjusting circuit 211 (e.g., a FIFO), and is then input to the comparison circuit 217. On the other hand, the reproduction data 215 is subjected to synchronization processing and demodulation processing, as described above, so as to have the same bit arrangement as that of the recording data, and is then input from the ODC 201 to the comparison circuit 217. The comparison circuit 217 compares the recording data 213 with the reproduction data 215 in units of bits. In this case, a bit for which an error is detected is set to be "1". Subsequently, the SP converter 218 converts the bit flow of the comparison result output from the comparison circuit 217 from serial data to parallel data. The parallel data is generated in units of bytes (8 bits).

On the other hand, the disk defect detection signal 266 sent from the disk defect detection circuit 218 (FIG. 26) is byte-synchronized with the SP-converted comparison result signal (error detection signal) by the delay circuit 226, and is then input to the deinterleave control circuit 219. The deinterleave control circuit 219 achieves data synchronization of the data comparison result and the disk defect detection result in units of interleaves.

The error counters 220 and 227 respectively count the number of errors and the number of defects, which are detected upon data comparison, from the output from the deinterleave circuit 219. The error counter 220 is designed to count two values, i.e., the number of errors in each interleave, and the total number of errors generated in all of the interleaves in one sector. Similarly, the error counter 227 counts the number of defects in each interleave, and the total number of defects in all of the interleaves in one sector. The register 222 is set in advance with a reference value of the number of errors, which value is used for determining whether recording is normally performed or causes a verifying error upon comparison with the number of detected errors. In the register 222, two reference values, i.e., an allowable value of the number of errors in each interleave, and an allowable value of the total number of errors generated in all of the interleaves in one sector are set in correspondence with the error counter. Similarly, the register 228 is set in advance with a reference value of the number of defects, which value is used for determining whether or not recording is normally performed upon comparison with the number of detected defects. The reference value stored in the register 228 includes two reference values, i.e., an allowable value of the number of defects in each interleave, and an allowable value of the total number of defects in all of the interleaves in one sector.

The verifying determining circuit 221 compares the count values of the error counters 220 and 227 with the reference values stored in the registers 222 and 228 to determine whether or not recording is normally performed, and supplies a determining signal 216 to the ODC 201 together with the determination result of the synchronous signal. The determination criteria of the verifying determining circuit 221 are as follows.

1) If the number of bytes per interleave corresponding to detected errors or detected defects is 6 bytes or more, the corresponding sector is determined as an NG sector.

2) Even when the number of bytes per interleave corresponding to detected errors is 4 bytes or more, if the number of bytes corresponding to detected defects is 2 or less, it is determined that recording is good (verifying OK).

3) If the total number of bytes per sector corresponding to detected errors or detected defects is 20 bytes or more, the corresponding sector is determined as an NG sector.

4) Even when the total number of bytes per sector corresponding to detected errors is 15 bytes or more, if the total number of bytes corresponding to detected defects is 10 or less, "verifying OK" is determined.

Table 1 below summarizes the above-mentioned determination criteria of the recording state.

TABLE 1

| Determination Criteria of Verifying Determining Circuit | | |
|---|---|---|
| No. of errors per interleave (No. of errors per sector) | No. of defects per interleave (No. of defects per sector) | Determination Result |
| 3 bytes or less (14 bytes or less) | 2 or less (10 or less) | OK |
| 3 bytes or less (14 bytes or less) | 3 to 5 (11 to 19) | NG |
| 3 bytes or less (14 bytes or less) | 6 or more (20 or more) | NG |
| 4 to 5 bytes (15 to 19 bytes) | 2 or less (10 or less) | OK |
| 4 to 5 bytes (15 to 19 bytes) | 3 to 5 (11 to 19) | NG |
| 4 to 5 bytes (15 to 19 bytes) | 6 or more (20 or more) | NG |
| 6 bytes or more (20 bytes or more) | 2 or less (10 or less) | NG |
| 6 bytes or more (20 bytes or more) | 3 to 5 (11 to 19) | NG |
| 6 bytes or more (20 bytes or more) | 6 or more (20 or more) | NG |

In this embodiment, the threshold values of the numbers of errors and defects in recording error determination are set to be 6 bytes and 3 defects per interleave, and 20 bytes and 11 defects per sector. However, the present invention is not limited to these threshold values, and the threshold values may be desirably set. Determination may be made using only the numbers of errors and defects per interleave. Similarly, determination may be made using only the number of errors and defects per sector.

As a developed form of this embodiment, a third error counter may be added, and the deinterleave control circuit may detect whether or not errors and defects are detected at the same positions (in units of bytes). The same position detection result is input to the third error counter, and verifying determination is made using this count value and the count values of the above-mentioned two counters. In this case, the count value of errors caused by defects is corrected to more precisely determine a recording error.

Figure 31:
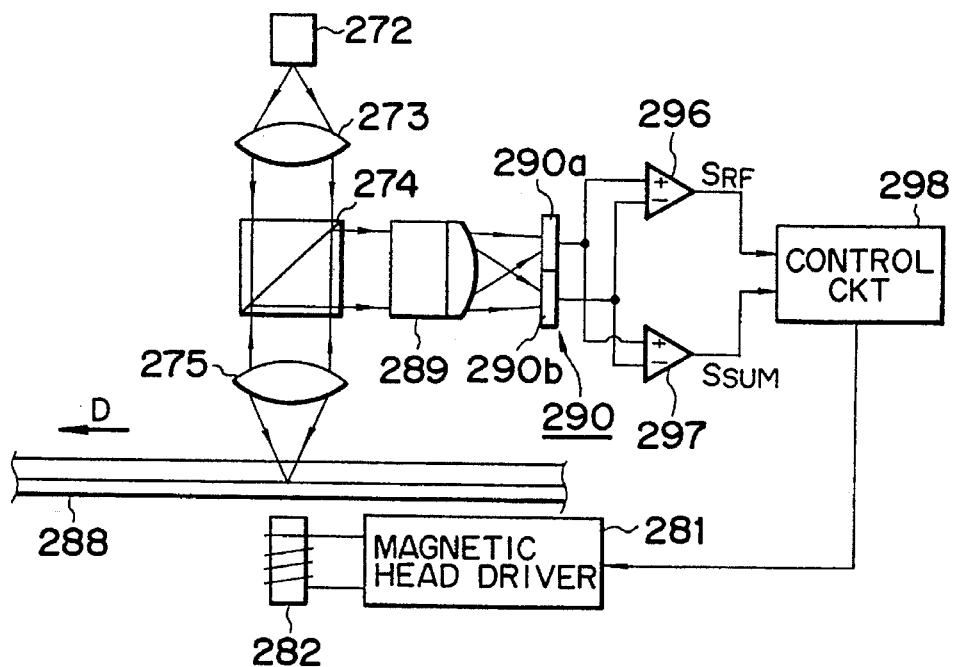
FIG. 31 is a schematic diagram showing a data recording apparatus according to the fifth embodiment of the present invention.

In the above embodiments, the direct verifying method using a plurality of light beams is adopted. However, the present invention can also adopt a so-called one-beam direct verifying method for performing verification by reproducing data using a recording beam reflected by a medium. FIG. 31 is a schematic diagram showing such a data recording apparatus according to the fifth embodiment of the present invention. The same reference numerals in FIG. 31 denote the same parts as in FIG. 9, and a detailed description thereof will be omitted.

In FIG. 31, a magnetooptical disk 288 as a recording medium has a magnetic recording layer constituted by two exchange-coupled layers which are a high-coercive force layer having a high Curie temperature and a low-coercive force layer having a low Curie temperature. The principle of the direct verifying method using a medium having a two-layered recording layer is described in detail in, e.g., Japanese Patent Application No. 3-175159. The disk 288 is rotated by a motor (not shown), and is moved in a direction of an arrow D.

The construction of the apparatus shown in FIG. 31 is basically the same as that of the apparatus shown in FIG. 9. In this apparatus, however, a light beam emitted from a light source 272 is radiated onto the disk 288 to record data, and at the same time, the light beam reflected by the medium is detected. The reflected light is modulated in the direction of polarization according to data recorded on the disk due to the magnetooptical effect. Therefore, the reflected light is split into two beams by a Wollaston prism 289, and the split beams are respectively received by two split light-receiving surfaces 290a and 290b of a photodetector 290, thereby reading out data in the same manner as the reflected light 295 in FIG. 21. The outputs from the light-receiving surfaces 290a and 290b are input to a differential amplifier 296 and an adder 297. The differential amplifier 296 and the adder 297 respectively supply a reproduction signal $S_{RF}$ and a sum signal $S_{SUM}$ to a control circuit 298.

The construction of the control circuit 298 is basically the same as that shown in FIG. 26. In this circuit, the signal output from the differential amplifier 296 is input to a binarizing circuit, and the signal output from the adder 297 is input to a disk defect detection circuit.

In the control circuit 298, recording error determination is made in the same manner as in the fourth embodiment. However, the control circuit 298 has different determination criteria from those of the fourth embodiment. More specifically, the determination criteria are as follows.

1) If the number of bytes per interleave corresponding to detected errors or detected defects is 6 bytes or more, the corresponding sector is determined as an NG sector.

2) Even when the number of bytes per interleave corresponding to detected errors is 3 bytes or less, if the number of bytes corresponding to detected defects is 4 or more, "verifying NG" is determined.

3) If the total number of bytes per sector corresponding to detected errors or detected defects is 20 bytes or more, the corresponding sector is determined as an NG sector.

4) Even when the total number of bytes per sector corresponding to detected errors is 15 bytes or less, if the total number of bytes corresponding to detected defects is 16 or more, "verifying NG" is determined.

In this embodiment, the threshold values of the numbers of errors and defects in recording error determination are set to be 6 bytes and 4 defects per interleave, and 20 bytes and 16 defects per sector. However, the present invention is not limited to these threshold values, and the threshold values may be desirably set. Determination may be made using only the numbers of errors and defects per interleave. Similarly, determination may be made using only the number of errors and defects per sector.

Table 2 below summarizes the recording error determination criteria of this embodiment.

TABLE 2

Determination Criteria of Verifying Determining Circuit

| No. of errors per interleave (No. of errors per sector) | No. of defects per interleave (No. of defects per sector) | Determination Result |
|---|---|---|
| 3 bytes or less (15 bytes or less) | 3 or less (15 or less) | OK |
| 3 bytes or less (15 bytes or less) | 4 to 5 (16 to 19) | NG |
| 3 bytes or less (15 bytes or less) | 6 or more (20 or more) | NG |
| 4 to 5 bytes (16 to 19 bytes) | 3 or less (15 or less) | OK |
| 4 to 5 bytes (16 to 19 bytes) | 4 to 5 (16 to 19) | NG |
| 4 to 5 bytes (16 to 19 bytes) | 6 or more (20 or more) | NG |
| 6 bytes or more (20 bytes or more) | 3 or less (15 or less) | NG |
| 6 bytes or more (20 bytes or more) | 4 to 5 (16 to 19) | NG |
| 6 bytes or more (20 bytes or more) | 6 or more (20 or more) | NG |

Figure 32:
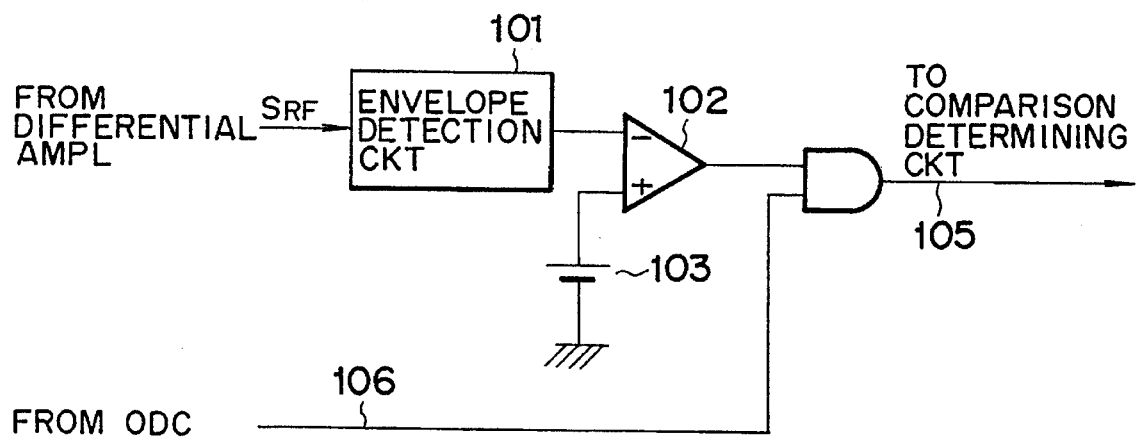
FIG. 32 is a block diagram showing another arrangement of a defect detection circuit used in the present invention.
Figure 33A:
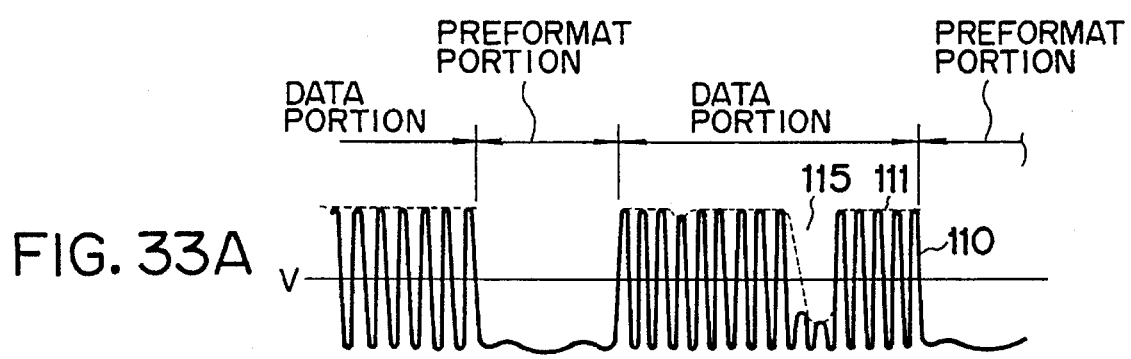
FIGS. 33A to 33D are waveform charts for explaining a defect detection state in the circuit shown in FIG. 32.
Figure 33B:
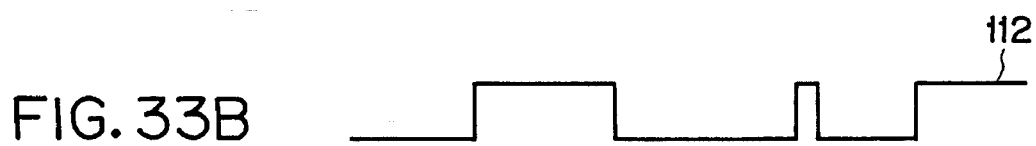
Figure 33C:
Figure 33D:

In the above embodiment, a portion where the reflectance of the medium abruptly changes is detected as a defect. Alternatively, a defect may be detected by monitoring the amplitude of a readout data signal since the amplitude of the defect portion of the readout data signal becomes smaller than that of a normal portion. FIG. 32 shows such a medium defect detection circuit. The circuit shown in FIG. 32 can be used in place of the disk defect detection circuit 218 shown in FIG. 26. In this case, the defect detection circuit receives the reproduction signal from the differential amplifier in place of the sum signal from the adder.

FIGS. 33A to 33D show signal waveforms in the respective sections of the circuit shown in FIG. 32. In the circuit shown in FIG. 32, a reproduction signal waveform 110 (FIG. 33A) is input to an envelope detection circuit 101. The waveform 110 has a small amplitude at a defect portion 115. The envelope detection circuit 101 outputs an envelope signal indicated by a broken waveform 111. The envelope signal 111 is compared by a comparator 102 with a reference value V determined by a voltage generated by a voltage source 103. The comparator 102 outputs a signal 112 (FIG. 33B), which goes to high level when the envelope signal 111 is lower than the reference value V. Since no magnetooptical signal is generated in correspondence with a preformat portion, which pre-records addresses, and the like, of recorded information, the signal 112 goes to high level although no defect is present. In order to remove this influence, an ODC supplies a signal 113 (FIG. 33C), which goes to low level at a timing corresponding to the preformat portion, and an AND gate calculates a logical product signal of the signals 112 and 113, thereby obtaining a defect detection signal 114 (FIG. 33D) which has a high-level pulse in correspondence with only a defect portion. This defect detection signal is supplied to a comparison/determining circuit like that in the fourth embodiment.

The present invention allows various other applications in addition to the above-mentioned embodiments. For example, the present invention is not limited to the magnetooptical disk apparatus described in the above embodiments, and may be applied to optical data recording apparatuses other than a magnetooptical data recording apparatus, as proposed by Japanese Laid-Open Patent Application No. 59-167855, or to magnetic recording apparatuses using no light beams. The shape of a recording medium is not limited to a disk shape. For example, the recording medium may have a card-like shape, a tape-like shape, and the like. The present invention includes such applications without departing from the scope of claims.

What is claimed is:

1. A method of judging recording comprising the steps of:

recording data onto a recording medium;

counting the number of data errors in a predetermined number of interleaves, determined by comparison determining means, simultaneously with the recording;

counting the number of errors on the recording medium in the predetermined number of interleaves, detected by defect detecting means;

judging whether or not the recording quality is good on the basis of a combination of (i) the number of data errors determined by the comparison determining means and (ii) the number of errors detected by the defect detecting means, in the predetermined number of interleaves; and setting a plurality of verifying determination reference values for comparison and determination of data and a plurality of verifying determination reference values for detection of defects, even if a result of a comparison and determination of data exceeds a first determination reference value, and wherein if a verifying determination for a detection of defects does not exceed a second determination reference value, the recording is judged as being good, and if the result of comparison and determination of data exceeds a third determination reference value, larger than the first determination reference value, or the verifying determination result for detection of defects exceeds a fourth determination reference value, larger than the second determination reference value, the recording is judged as being not good.

2. A method according to claim 1, wherein the number of errors are respectively counted when a position of an error determined by the comparison and determination of data is identical with a position of an error detected by the verifying determination for detection of defects, and the verifying determination is performed by taking into consideration a duplication of the counted number of errors determined by the comparison and determination of data and the counted number of errors detected by the detection of defects.

3. A method of judging recording comprising the steps of:

recording data onto a recording medium;

counting the number of data errors in a predetermined number of interleaves, determined by comparison determining means, simultaneously with the recording;

counting the number of errors on the recording medium in the predetermined number of interleaves, detected by defect detecting means:

judging whether or not the recording quality is good on the basis of a combination of (i) the number of data errors determined by the comparison determining means and (ii) the number of errors detected by the defect detecting means, in the predetermined number of interleaves; and setting a plurality of verifying determination reference values for comparison and determination of data and a plurality of verifying determination reference values for detection of defects, even if a result of a comparison and determination of data does not exceed a first determination reference value, and wherein if a verifying determination for detection of defects exceeds a second determination reference value, the recording is judged as being not good.

4. A method according to claim 3, wherein the number of errors are respectively counted when a position of an error determined by the comparison and determination of data is identical with a position of an error detected by the verifying determination for detection of defects, and the verifying determination is performed by taking into consideration a duplication of the counted number of errors determined by the comparison and determination of data and the counted number of errors detected by the detection of defects.

5. A method of judging recording comprising the steps of:

recording data onto a recording medium;

counting the number of data errors in a predetermined number of interleaves, determined by comparison determining means, simultaneously with the recording;

counting the number of errors on the recording medium in the predetermined number of interleaves, detected by defect detecting means;

counting the number of errors in a synchronous signal in predetermined number of sectors;

judging whether or not the recording quality is good on the basis of a combination of (i) the number of errors determined by the comparison determining means in the predetermined number of interleaves, (ii) the number of errors detected by the defect detecting means in the predetermined number of interleaves and (iii) the number of errors of the synchronous signal in the predetermined number of sectors; and setting a plurality of verifying determination reference values for comparison and determination of data and a plurality of verifying determination reference values for detection of defects, even if a result of a comparison and determination of data exceeds a first determination reference value, and wherein if a verifying determination for detection of defects does not exceed a second determination reference value, the recording is judged as being good, and if the result of comparison and determination of data exceeds a third determination reference value, larger than the first determination reference value, or the verifying determination result for detection of defects exceeds a fourth determination reference value, larger than the second determination reference value, the recording is judged as being not good.

6. A method according to claim 5, wherein the number of errors are respectively counted when a position of an error determined by the comparison and determination of data is identical with a position of an error detected by the verifying determination for detection of defects, and the verifying determination is performed by taking into consideration a duplication of the counted number of errors determined by the comparison and determination of data and the counted number of errors detected by the detection of defects.

7. A method of judging recording comprising the steps of:

recording data onto a recording medium;

counting the number of data errors in a predetermined number of interleaves, determined by comparison determining means, simultaneously with the recording;

counting the number of errors on the recording medium in the predetermined number of interleaves, detected by defect detecting means;

counting the number of errors in a synchronous signal in a predetermined number of sectors;

judging whether or not the recording quality is good on the basis of a combination of (i) the number of errors determined by the comparison determining means in the predetermined number of interleaves, (ii) the number of errors detected by the defect detecting means in the predetermined number of interleaves and (iii) the number of errors of the synchronous signal in the predetermined number of sectors; and setting a plurality of verifying determination reference values for comparison and determination of data and a plurality of verifying determination reference values for detection of defects, even if a result of a comparison and determination of data does not exceed a first determination reference value, and wherein if a verifying determination for detection of defects exceeds a second determination reference value, the recording is judged as being not good.

8. A method according to claim 7, wherein the number of errors are counted when a position of an error determined by the comparison and determination of data is identical with a position of an error detected by the verifying determination for detection of defects, and the verifying determination is performed by taking into consideration a duplication of the counted number of errors determined by the comparison and determination of data and the counted number of errors detected by the detection of defects.

9. A data recording apparatus comprising:

recording means for recording data onto a recording medium;

first count means for counting the number of data errors in a predetermined number of interleaved, determined by comparison determining means, simultaneously with the recording by said recording means;

second count means for counting the number of errors on the recording medium in the predetermined number of interleaves, detected by defect detecting means;

judging means for judging whether or not the recording quality is good on the basis of a combination of (i) the number of errors determined by the comparison determining means and (ii) the number of errors detected by the defect detecting means, in the predetermined number of interleaves; and means for setting a plurality of verifying determination reference values for comparison and determination of data and a plurality of verifying determination reference values for detection of defects, even if a result of a comparison and determination of data exceeds a first determination reference value, and wherein if a verifying determination for detection of defects does not exceed a second determination reference value, the recording is judged as being good, and if the result of comparison and determination of data exceeds a third determination reference value, larger than the first determination reference value, or the verifying determination result for detection of defects exceeds a fourth determination reference value, larger than the second determination reference value, the recording is judged as being not good.

10. An apparatus according to claim 9, wherein the number of errors are respectively counted when a position of an error determined by the comparison and determination of data is identical with a position of an error detected by the verifying determination for detection of defects, and the verifying determination is performed by taking into consideration a duplication of the counted number of errors determined by the comparison and determination of data and the counted number of errors detected by the detection of defects.

11. A data recording apparatus comprising:

recording means for recording data onto a recording medium;

first count means for counting the number of data errors in a predetermined number of interleaves, determined by comparison determining means, simultaneously with the recording by said recording means;

second count means for counting the number of errors on the recording medium in the predetermined number of interleaves, detected by defect detecting means;

judging means for judging whether or not the recording quality is good on the basis of a combination of (i) the number of errors determined by the comparison determining means and (ii) the number of errors detected by the defect detecting means, in the predetermined number of interleaves; and means for setting a plurality of verifying determination reference values for comparison and determination of data and a plurality of verifying determination reference values for detection of defects, even if a result of comparison and determination of data does not exceed a first determination reference value, and wherein if a verifying determination for detection of defects exceeds a second determination reference value, the recording is judged as being not good.

12. An apparatus according to claim 11, wherein the number of errors are respectively counted when a position of an error determined by the comparison and determination of data is identical with a position of an error detected by the verifying determination for detection of defects, and the verifying determination is performed by taking into consideration a duplication of the counted number of errors determined by the comparison and determination of data and the counted number of errors detected by the detection of defects.

13. A data recording apparatus comprising:

recording means for recording data onto a recording medium;

first count means for counting the number of data errors in a predetermined number of interleaves, determined by comparison determining means, simultaneously with the recording by said recording means;

second count means for counting the number of errors on the recording medium in the predetermined number of interleaves, detected by defect detecting means;

third count means for counting the number of errors of a synchronous signal in a predetermined number of sectors;

judging means for judging whether or not the recording quality is good on the basis of a combination of (i) the number of errors determined by the comparison determining means in the predetermined number of interleaves, (ii) the number of errors detected by the defect detecting means in the predetermined number of interleaves and (ii) the number of errors of the synchronous signal in the predetermined number of sectors; and means for setting a plurality of verifying determination reference values for comparison and determination of data and a plurality of verifying determination reference values for detection of defects, even if a result of comparison and determination of data exceeds a first determination reference value, and wherein if a verifying determination for detection of defects does not exceed a second determination reference value, the recording is judged as being good, and if the result of comparison and determination of data exceeds a third determination reference value, larger than the first determination reference value, or the verifying determination result for detection of defects exceeds a fourth determination reference value, larger than the second determination reference value, the recording is judged as being not good.

14. An apparatus according to claim 13, wherein the number of errors are respectively counted when a position of an error determined by the comparison and determination of data is identical with a position of an error detected by the verifying determination for detection of defects, and the verifying determination is performed by taking into consideration a duplication of the counted number of errors determined by the comparison and determination of data and the counted number of errors detected by the detection of defects.

15. A data recording apparatus comprising:

recording means for recording data onto a recording medium;

first count means for counting the number of data errors in a predetermined number of interleaves, determined by comparison determining means, simultaneously with the recording by said recording means;

second count means for counting the number of errors on the recording medium in the predetermined number of interleaves, detected by defect detecting means;

third count means for counting the number of errors of a synchronous signal in a predetermined number of sectors;

judging means for judging whether or not the recording quality is good on the basis of a combination of (i) the number of errors determined by the comparison determining means in the predetermined number of interleaves, (ii) the number of errors detected by the defect detecting means in the predetermined number of interleaves and (iii) the number of errors of the synchronous signal in the predetermined number of sectors; and means for setting a plurality of verifying determination reference values for comparison and determination of data and a plurality of verifying determination reference values for detection of defects, even if a result of a comparison and determination of data does not exceed a first determination reference value, and wherein if a verifying determination for detection of defects exceeds a second determination reference value, the recording is judged as being not good.

16. An apparatus according to claim 15, wherein the number of errors are respectively counted when a position of an error determined by the comparison and determination of data is identical with a position of an error detected by the verifying determination for detection of defects, and the verifying determination is performed by taking into consideration a duplication of the counted number of errors determined by the comparison and determination of data and the counted number of errors detected by the detection of defects.

* * * * *

UNITED STATES PATENT AND TRADEMARK OFFICE
CERTIFICATE OF CORRECTION

PATENT NO. : 5,517,471
DATED : May 14, 1996
INVENTOR(S) : TAKAAKI ASHINUMA, ET AL.

It is certified that error appears in the above-indentified patent and that said Letters Patent is hereby corrected as shown below:

COLUMN 6

Line 48, "to be" should read --to be a--.

COLUMN 10

Line 25, "be-detected" should read --be detected--.

COLUMN 15

Line 65, "iS" should read --is--.

COLUMN 26

Line 16, "signal in" should read --signal in a--.

COLUMN 27

Line 26, "interleaved," should read --interleaves--.

UNITED STATES PATENT AND TRADEMARK OFFICE
CERTIFICATE OF CORRECTION

PATENT NO. : 5,517,471

DATED : May 14, 1996

INVENTOR(S) : TAKAAKI ASHINUMA, ET AL.

It is certified that error appears in the above-indentified patent and that said Letters Patent is hereby corrected as shown below:

<u>COLUMN 28</u>

Line 52, "(ii)" should read --(iii)--.

Signed and Sealed this

First Day of October, 1996

BRUCE LEHMAN

Attest:

*Attesting Officer*          *Commissioner of Patents and Trademarks*